(12) United States Patent
Mengel et al.

(10) Patent No.: US 8,470,417 B2
(45) Date of Patent: Jun. 25, 2013

(54) PACKAGING INSERTS WITH MYOGLOBIN BLOOMING AGENTS, PACKAGES AND METHODS FOR PACKAGING

(75) Inventors: Matthew LeRoy Mengel, Oshkosh, WI (US); Douglas Mark Latreille, Neenah, WI (US); Dan G. Siegel, Belleville, IL (US)

(73) Assignee: Curwood, Inc., Oshkosh, WI (US)

( * ) Notice: Subject to any disclaimer, the term of this patent is extended or adjusted under 35 U.S.C. 154(b) by 1186 days.

(21) Appl. No.: 11/523,953

(22) Filed: Sep. 20, 2006

(65) Prior Publication Data

US 2007/0014947 A1 Jan. 18, 2007

Related U.S. Application Data

(63) Continuation-in-part of application No. PCT/US2005/011387, filed on Apr. 4, 2005, which is a continuation-in-part of application No. 11/413,504, filed on Apr. 28, 2006, now Pat. No. 7,867,531, which is a continuation-in-part of application No. PCT/US2005/011387, filed on Apr. 4, 2005, application No. 11/523,953, which is a continuation-in-part of application No. 11/436,159, filed on May 17, 2006, now Pat. No. 8,110,259, which is a continuation-in-part of application No. PCT/US2005/011387, filed on Apr. 4, 2005, application No. 11/523,953, which is a continuation-in-part of application No. 11/451,968, filed on Jun. 12, 2006, now Pat. No. 8,029,893, which is a continuation-in-part of application No. PCT/US2005/011387, filed on Apr. 4, 2005, application No. 11/523,953, which is a continuation-in-part of application No. 11/506,322, filed on Aug. 18, 2006, which is a continuation-in-part of application No. PCT/US2005/011387, filed on Apr. 4, 2005.

(60) Provisional application No. 60/559,350, filed on Apr. 2, 2004.

(51) Int. Cl.
*B32B 1/02* (2006.01)
*B32B 1/08* (2006.01)

(52) U.S. Cl.
USPC ....... 428/34.1; 428/34.2; 428/35.7; 428/35.9; 428/36.9

(58) Field of Classification Search
USPC ............. 428/34.1, 34.2, 35.7, 35.9, 36.9
See application file for complete search history.

(56) References Cited

U.S. PATENT DOCUMENTS

| 2,101,547 A | 12/1937 | Kistler | 99/159 |
| 2,147,261 A | 2/1939 | Lewis | 99/107 |

(Continued)

FOREIGN PATENT DOCUMENTS

| CA | 857827 | 12/1970 |
| CA | 878423 | 8/1971 |

(Continued)

OTHER PUBLICATIONS

Sacharow, S.; Griffin, R.C.; *Food Packaging*; AVI Publishing: Westport, CT, 1970; "Red Meats," pp. 95-119.

(Continued)

*Primary Examiner* — Marc Patterson
(74) *Attorney, Agent, or Firm* — Tom J. Hall

(57) ABSTRACT

Food packaging inserts comprising a myoglobin blooming agent that promote or preserve the desirable appearance of food products, food packages, and methods of food packing comprising the same, are provided.

75 Claims, 5 Drawing Sheets

U.S. PATENT DOCUMENTS

| | | | |
|---|---|---|---|
| 2,417,889 A | 3/1947 | Stammelman | |
| 2,528,204 A | 10/1950 | Zwosta | |
| 2,621,129 A | 12/1952 | Ramsbottom et al. | |
| 2,788,278 A | 4/1957 | Zimont et al. | |
| 2,863,777 A | 12/1958 | Dekker | |
| 2,895,270 A | 7/1959 | Blaess | |
| 2,902,369 A | 9/1959 | Komarik | 99/159 |
| 2,923,632 A | 2/1960 | Castberg | |
| 2,925,346 A | 2/1960 | Harper et al. | |
| 2,979,410 A | 4/1961 | Parlour | |
| 2,991,600 A * | 7/1961 | Lancaster | 53/433 |
| 2,992,600 A | 7/1961 | Lancaster | |
| 3,003,883 A | 10/1961 | Levy | |
| 3,042,532 A | 7/1962 | Daline | |
| 3,047,403 A | 7/1962 | McConnell | |
| 3,134,678 A | 5/1964 | Wierbicki et al. | |
| 3,154,423 A | 10/1964 | Voegeli et al. | |
| 3,215,540 A | 11/1965 | Wierbicki et al. | |
| 3,355,319 A | 11/1967 | Rees | |
| 3,360,381 A | 12/1967 | Tarladgis | |
| 3,361,577 A | 1/1968 | Simon et al. | |
| 3,378,379 A | 4/1968 | Shiner et al. | |
| 3,384,993 A | 5/1968 | Kane | |
| 3,451,827 A | 6/1969 | Bridgeford | |
| 3,456,044 A | 7/1969 | Pahlke | |
| 3,526,521 A | 9/1970 | Komarik | |
| 3,537,864 A | 11/1970 | Magiera | |
| 3,590,528 A | 7/1971 | Shepherd | |
| 3,645,757 A | 2/1972 | Gordon et al. | |
| 3,666,488 A | 5/1972 | Nakao et al. | 99/107 |
| 3,713,849 A | 1/1973 | Grindrod et al. | |
| 3,740,236 A | 6/1973 | Baxley | |
| 3,741,253 A | 6/1973 | Brax et al. | |
| 3,814,821 A | 6/1974 | Oliver et al. | |
| 3,835,618 A | 9/1974 | Perdue | |
| 3,849,241 A | 11/1974 | Butin et al. | |
| 3,911,146 A | 10/1975 | Hara et al. | 426/265 |
| 3,936,560 A | 2/1976 | Santurri et al. | 428/219 |
| 3,950,919 A | 4/1976 | Perdue | |
| 3,966,045 A | 6/1976 | Perdue | |
| 3,966,974 A | 6/1976 | Bharucha et al. | |
| 4,001,445 A | 1/1977 | Horrocks et al. | |
| 4,001,446 A | 1/1977 | Hood | |
| 4,013,797 A | 3/1977 | Gryczka | |
| 4,053,650 A | 10/1977 | Chino et al. | |
| 4,055,672 A | 10/1977 | Hirsch et al. | |
| 4,064,296 A | 12/1977 | Bornstein et al. | |
| 4,089,983 A | 5/1978 | Hood | |
| RE30,009 E | 5/1979 | Perdue et al. | |
| 4,161,545 A | 7/1979 | Green et al. | |
| 4,196,220 A | 4/1980 | Chiu et al. | |
| 4,289,832 A * | 9/1981 | Schwarz | 521/55 |
| 4,308,289 A | 12/1981 | Huisman et al. | |
| 4,391,862 A | 7/1983 | Bornstein et al. | |
| 4,397,891 A | 8/1983 | Kaelberer et al. | |
| 4,407,897 A | 10/1983 | Farrell et al. | |
| 4,416,909 A | 11/1983 | Aversano | 426/265 |
| 4,420,530 A | 12/1983 | Toyoda et al. | |
| 4,425,395 A | 1/1984 | Negishi et al. | |
| 4,425,410 A | 1/1984 | Farrell et al. | |
| 4,448,792 A | 5/1984 | Schirmer | |
| 4,457,960 A | 7/1984 | Newsome | |
| 4,476,112 A | 10/1984 | Aversano | |
| 4,499,225 A | 2/1985 | Kudo et al. | |
| 4,501,758 A | 2/1985 | Morris | |
| 4,510,914 A | 4/1985 | Purser | |
| 4,522,835 A | 6/1985 | Woodruff et al. | |
| 4,610,914 A | 9/1986 | Newsome | |
| 4,611,456 A | 9/1986 | Gillio-tos et al. | |
| 4,642,239 A | 2/1987 | Ferrar et al. | 426/396 |
| 4,683,139 A * | 7/1987 | Cheng | 426/265 |
| 4,728,518 A | 3/1988 | Gonzalez et al. | |
| 4,737,391 A | 4/1988 | Lustig et al. | |
| 4,753,809 A | 6/1988 | Webb | |
| 4,755,403 A | 7/1988 | Ferguson | |
| 4,755,419 A | 7/1988 | Shah | |
| 4,756,914 A | 7/1988 | Jon et al. | |
| 4,770,944 A | 9/1988 | Farrell et al. | |
| 4,781,934 A | 11/1988 | Shimp et al. | |
| 4,792,484 A | 12/1988 | Moritani | |
| 4,801,486 A | 1/1989 | Quacquarella et al. | |
| 4,810,541 A | 3/1989 | Newman et al. | |
| 4,818,548 A | 4/1989 | Cheng | |
| 4,877,846 A * | 10/1989 | Chung | 525/369 |
| 4,929,480 A | 5/1990 | Midkiff et al. | |
| 4,929,482 A | 5/1990 | Moritani et al. | |
| 4,954,526 A | 9/1990 | Keefer | |
| 4,960,639 A | 10/1990 | Oda et al. | |
| 4,962,728 A | 10/1990 | Highfill | 119/3 |
| 4,981,707 A | 1/1991 | Morris | |
| 4,990,184 A | 2/1991 | Dotson et al. | |
| 5,039,705 A | 8/1991 | Keefer et al. | |
| 5,047,253 A | 9/1991 | Juhl et al. | |
| 5,055,328 A | 10/1991 | Evert et al. | |
| 5,058,761 A | 10/1991 | Williams | |
| 5,063,644 A | 11/1991 | Herrington et al. | |
| 5,108,804 A | 4/1992 | Oxley et al. | |
| 5,139,700 A | 8/1992 | Miksic et al. | |
| 5,153,038 A | 10/1992 | Koyama et al. | |
| 5,155,137 A | 10/1992 | Keefer et al. | |
| 5,209,869 A | 5/1993 | Miksic et al. | |
| 5,221,566 A | 6/1993 | Tokoh et al. | |
| 5,223,311 A | 6/1993 | Tsutsumi et al. | |
| 5,230,915 A | 7/1993 | Shahidi et al. | 426/240 |
| 5,256,458 A | 10/1993 | Oxley et al. | |
| 5,281,471 A | 1/1994 | Diete et al. | |
| 5,288,532 A | 2/1994 | Juhl et al. | |
| 5,301,394 A | 4/1994 | Richarson et al. | |
| 5,317,052 A | 5/1994 | Ohba et al. | |
| 5,352,467 A | 10/1994 | Mitchell et al. | |
| 5,374,457 A | 12/1994 | Juhl et al. | |
| 5,382,391 A | 1/1995 | Juhl et al. | |
| 5,382,470 A | 1/1995 | Vicik | |
| 5,384,149 A | 1/1995 | Lin | |
| 5,393,457 A | 2/1995 | Miksic et al. | |
| 5,405,857 A | 4/1995 | Karup et al. | |
| 5,407,611 A | 4/1995 | Wilhoit et al. | |
| 5,416,131 A | 5/1995 | Wolff et al. | |
| 5,425,956 A * | 6/1995 | Shahidi et al. | 426/92 |
| 5,442,837 A | 8/1995 | Morgan | |
| 5,443,852 A | 8/1995 | Shahidi et al. | 426/92 |
| 5,472,722 A | 12/1995 | Burger | 426/264 |
| 5,481,852 A | 1/1996 | Mitchell | 53/432 |
| RE35,285 E | 6/1996 | Quacquarella et al. | |
| 5,525,357 A | 6/1996 | Keefer et al. | |
| 5,558,891 A | 9/1996 | Lawless et al. | |
| 5,573,797 A | 11/1996 | Wilhoit | |
| 5,573,800 A | 11/1996 | Wilhoit | |
| 5,573,801 A | 11/1996 | Wilhoit | |
| 5,591,468 A | 1/1997 | Stockley, III et al. | |
| 5,593,747 A | 1/1997 | Georgelos | |
| 5,597,599 A | 1/1997 | Smith et al. | |
| 5,663,002 A | 9/1997 | Schirmer | |
| 5,667,827 A | 9/1997 | Breen et al. | 426/129 |
| 5,711,978 A | 1/1998 | Breen et al. | 426/129 |
| 5,715,945 A | 2/1998 | Chandler | |
| 5,759,648 A | 6/1998 | Idlas | |
| 5,759,650 A | 6/1998 | Raines et al. | |
| 5,770,645 A | 6/1998 | Stamler et al. | |
| 5,800,412 A | 9/1998 | Zhang et al. | |
| 5,834,077 A | 11/1998 | Babrowicz | |
| 5,834,098 A | 11/1998 | Kitamura et al. | |
| 5,840,381 A | 11/1998 | Ohtsuka | |
| 5,845,769 A | 12/1998 | Yeager | |
| 5,846,582 A | 12/1998 | Mayfield et al. | |
| 5,855,975 A | 1/1999 | Miksic et al. | |
| 5,866,184 A | 2/1999 | Gorlich et al. | |
| 5,888,528 A | 3/1999 | Wellinghoff et al. | |
| 5,894,040 A | 4/1999 | Foley et al. | |
| 5,895,587 A | 4/1999 | Sorensen | |
| 5,916,613 A | 6/1999 | Stockley | |
| 5,928,770 A | 7/1999 | Quinones | |
| 5,937,618 A | 8/1999 | Chandler | |
| 5,958,805 A | 9/1999 | Quinones | |
| 5,964,532 A | 10/1999 | Phillips et al. | |
| 5,965,264 A | 10/1999 | Barenberg et al. | |
| 5,989,610 A | 11/1999 | Ruzek | 426/281 |

| | | |
|---|---|---|
| 5,989,613 A | 11/1999 | Buchko |
| 5,994,444 A | 11/1999 | Trescony et al. |
| 6,020,012 A | 2/2000 | Kauffman et al. |
| 6,028,160 A | 2/2000 | Chandler et al. |
| 6,033,599 A | 3/2000 | Lozano et al. |
| 6,033,705 A | 3/2000 | Isaacs |
| 6,042,859 A | 3/2000 | Shaklai |
| 6,046,243 A | 4/2000 | Wellinghoff et al. |
| 6,068,933 A | 5/2000 | Shepard et al. |
| 6,074,715 A | 6/2000 | Lind et al. |
| 6,087,479 A | 7/2000 | Stamler et al. |
| 6,099,881 A | 8/2000 | Hanson .......... 426/263 |
| 6,113,962 A | 9/2000 | Spencer .......... 426/316 |
| 6,143,344 A | 11/2000 | Jon et al. |
| 6,204,223 B1 | 3/2001 | Holmes et al. |
| 6,210,725 B1 | 4/2001 | Colombo |
| 6,221,470 B1 | 4/2001 | Ciocca et al. |
| RE37,171 E | 5/2001 | Busche et al. |
| 6,232,434 B1 | 5/2001 | Stamler et al. |
| 6,242,371 B1 | 6/2001 | Quinones |
| 6,270,829 B1 | 8/2001 | Shahlai |
| 6,270,873 B1 | 8/2001 | Darnett |
| 6,287,613 B1 | 9/2001 | Childress et al. |
| 6,299,984 B1 | 10/2001 | Forloni |
| 6,316,067 B1 | 11/2001 | Edwards et al. |
| 6,403,759 B2 | 6/2002 | Stamler et al. |
| 6,409,384 B1 | 6/2002 | Provan et al. |
| 6,420,470 B1 | 7/2002 | Miksic et al. |
| 6,439,770 B2 | 8/2002 | Catchman |
| 6,447,826 B1 | 9/2002 | Matthews .......... 426/126 |
| 6,465,109 B2 | 10/2002 | Ohtsuka |
| 6,500,473 B1 | 12/2002 | Koehler et al. |
| 6,511,568 B1 | 1/2003 | Eckstein et al. |
| 6,514,583 B1 | 2/2003 | Ahlgren et al. |
| 6,521,275 B1 | 2/2003 | Mercogliano et al. |
| 6,524,002 B2 | 2/2003 | Tomic |
| 6,527,444 B1 | 3/2003 | Buchman |
| 6,533,962 B1 | 3/2003 | Tulka et al. |
| 6,562,476 B2 | 5/2003 | Shepard et al. |
| 6,565,985 B2 | 5/2003 | Ueyama et al. |
| 6,592,919 B1 | 7/2003 | Matthews et al. |
| 6,602,466 B2 | 8/2003 | Hamilton et al. |
| 6,609,827 B2 | 8/2003 | Bois et al. |
| 6,610,392 B1 | 8/2003 | Ramesh et al. |
| 6,616,333 B2 | 9/2003 | Kinigakis et al. |
| 6,617,041 B2 | 9/2003 | Hahn et al. |
| 6,623,773 B2 * | 9/2003 | Meier et al. .......... 426/132 |
| 6,632,021 B2 | 10/2003 | Bois et al. |
| 6,632,785 B2 | 10/2003 | Pfeiffer et al. |
| 6,651,874 B1 | 11/2003 | Pedersen |
| 6,663,283 B1 | 12/2003 | Cappel |
| 6,666,580 B2 | 12/2003 | Bois |
| 6,667,082 B2 | 12/2003 | Bamore et al. |
| 6,673,465 B2 | 1/2004 | Lordi |
| 6,673,891 B2 | 1/2004 | Stamler et al. |
| 6,682,825 B1 | 1/2004 | Kennedy et al. |
| 6,689,402 B1 | 2/2004 | Nauth et al. |
| 6,689,460 B2 | 2/2004 | Wen et al. |
| 6,699,549 B1 | 3/2004 | Ueyama et al. |
| 6,706,274 B2 | 3/2004 | Herrmann et al. |
| 6,716,464 B1 | 4/2004 | Schlegel et al. .......... 426/312 |
| 6,749,910 B1 | 6/2004 | Georgelos et al. |
| 6,753,054 B1 | 6/2004 | Lind et al. |
| 6,773,820 B1 | 8/2004 | Wilhoit et al. |
| 6,777,046 B1 | 8/2004 | Tatarka et al. |
| 6,815,023 B1 | 11/2004 | Tatarka et al. |
| 6,858,275 B2 | 2/2005 | Ferri et al. |
| 6,861,125 B1 | 3/2005 | Carlson et al. |
| 6,861,127 B2 | 3/2005 | Glawe et al. |
| 6,869,686 B1 | 3/2005 | Idlas |
| 6,875,840 B2 | 4/2005 | Stamler et al. |
| 6,879,027 B2 | 4/2005 | Sato |
| 6,881,430 B2 | 4/2005 | Køhler et al. |
| 6,887,994 B2 | 5/2005 | Stamler et al. |
| 6,939,569 B1 | 9/2005 | Green et al. |
| 6,942,909 B2 | 9/2005 | Shirrell et al. |
| 6,942,927 B2 | 9/2005 | Shepard et al. |
| 6,945,402 B1 | 9/2005 | Gueret |
| 6,964,816 B2 | 11/2005 | Schell et al. |
| 7,017,774 B2 | 3/2006 | Haedt |
| 7,018,719 B2 | 3/2006 | Ueyama et al. |
| 7,037,543 B2 | 5/2006 | Sandusky et al. .......... 426/129 |
| 7,335,327 B2 | 2/2008 | Grah et al. |
| 7,422,923 B2 | 9/2008 | Kojima et al. |
| 8,087,479 B2 | 1/2012 | Kulkarni et al. |
| 2001/0055640 A1 | 12/2001 | Meier et al. |
| 2002/0051754 A1 | 5/2002 | Schroeder et al. |
| 2002/0097923 A1 | 7/2002 | Dobreski et al. |
| 2002/0102405 A1 | 8/2002 | Chapman et al. |
| 2002/0119220 A1 | 8/2002 | Costello |
| 2002/0172834 A1 | 11/2002 | Rivett et al. |
| 2002/0196987 A1 | 12/2002 | Tilman et al. |
| 2002/0197467 A1 | 12/2002 | Johnson |
| 2003/0017194 A1 | 1/2003 | Joerger et al. |
| 2003/0039724 A1 | 2/2003 | DuCharme, et al. .......... 426/135 |
| 2003/0044492 A1 | 3/2003 | Knigge et al. |
| 2003/0203081 A1 | 10/2003 | Saari et al. |
| 2003/0235664 A1 | 12/2003 | Merical et al. |
| 2004/0009273 A1 | 1/2004 | Shaklai |
| 2004/0039683 A1 | 2/2004 | Mcgeorge |
| 2004/0076845 A1 | 4/2004 | Albright |
| 2004/0097630 A1 * | 5/2004 | Whitman et al. .......... 524/445 |
| 2004/0131805 A1 | 7/2004 | Merical et al. |
| 2004/0137202 A1 | 7/2004 | Hamilton et al. |
| 2004/0151853 A1 | 8/2004 | Shirrell et al. |
| 2004/0166262 A1 | 8/2004 | Busche et al. |
| 2005/0011387 A1 | 1/2005 | Schneider et al. |
| 2005/0019537 A1 | 1/2005 | Nakaishi et al. |
| 2005/0059655 A1 | 3/2005 | Garvey et al. |
| 2005/0084636 A1 | 4/2005 | Papenfus et al. |
| 2005/0089607 A1 | 4/2005 | Numata et al. |
| 2005/0106380 A1 | 5/2005 | Gray et al. |
| 2005/0129969 A1 | 6/2005 | Schell et al. |
| 2005/0249848 A1 | 11/2005 | Charest et al. |
| 2005/0254731 A1 | 11/2005 | Berbert et al. |
| 2006/0233985 A1 | 10/2006 | Pockat et al. |
| 2006/0246242 A1 | 11/2006 | Siegel et al. |
| 2006/0286323 A1 | 12/2006 | Siegel et al. |
| 2007/0014953 A1 | 1/2007 | Siegel et al. |
| 2007/0104901 A1 | 5/2007 | Siegel et al. |
| 2007/0246867 A1 | 10/2007 | Nelson et al. |

FOREIGN PATENT DOCUMENTS

| | | | |
|---|---|---|---|
| CA | 905744 | 7/1972 | .......... 99/97 |
| CA | 1053497 | 5/1979 | .......... 99/19 |
| CA | 1329890 | 5/1994 | |
| CA | 2007522 | 3/2000 | |
| CA | 2230614 | 4/2001 | |
| CA | 2100074 | 8/2003 | |
| CA | 2500860 | 12/2009 | |
| DE | 2 363 258 A1 | 7/1974 | |
| DE | 2 415 659 A1 | 10/1974 | |
| DE | 24 51 337 A1 | 8/1975 | |
| EP | 0 013 556 A1 | 7/1980 | |
| EP | 0120503 | 10/1984 | |
| EP | 0 172 432 A2 | 2/1986 | |
| EP | 0 202 771 A2 | 11/1986 | |
| EP | 0 224 990 A1 | 6/1987 | |
| EP | 0 364 624 A1 | 4/1990 | |
| EP | 0 491 164 A2 | 6/1992 | |
| EP | 0 473 091 B1 | 12/1995 | |
| EP | 0 662 527 B1 | 5/1997 | |
| EP | 1 138 478 A2 | 4/2001 | |
| EP | 0 788 319 B1 | 4/2002 | |
| FR | 2 634 976 | 2/1990 | |
| GB | 1 048 770 | 11/1966 | |
| GB | 1 253 449 A | 11/1971 | |
| GB | 1 475 994 A | 6/1977 | |
| GB | 2 187 081 A | 9/1987 | |
| JP | 57155975 | 9/1982 | |
| JP | 57-170175 A2 | 10/1982 | |
| JP | 57-170176 A2 | 10/1982 | |
| JP | 58073064 | 5/1983 | |
| JP | 58-101670 | 6/1983 | |
| JP | 59-085278 A | 5/1984 | |
| JP | 59178273 | 10/1984 | |
| JP | 64-071437 | 3/1989 | |
| JP | 01210340 A | 8/1989 | |

| JP | 04-318033 | 11/1992 |
| JP | 05-140344 | 6/1993 |
| JP | 06-049247 A | 2/1994 |
| JP | 06049247 A | 2/1994 |
| JP | 07-258467 | 10/1995 |
| JP | 10313821 | 12/1998 |
| JP | 2000015737 A | 1/2000 |
| JP | 2000141535 A | 5/2000 |
| JP | 2001258468 | 9/2001 |
| JP | 2002125621 | 5/2002 |
| JP | 2003191420 A | 7/2003 |
| JP | 4066071 | 1/2008 |
| JP | 5140344 | 11/2012 |
| WO | WO 92/15454 A1 | 9/1992 |
| WO | WO 96/14760 A1 | 5/1996 |
| WO | WO 99/23143 A1 | 5/1999 |
| WO | WO 00/69775 A1 | 11/2000 |
| WO | WO 02/056904 A1 | 7/2002 |
| WO | WO 03009709 | 2/2003 |
| WO | WO 2004/000541 A1 | 12/2003 |
| WO | 2004039683 A1 | 5/2004 |
| WO | WO-2004/039683 A1 | 5/2004 |
| WO | 2005097486 A1 | 10/2005 |

OTHER PUBLICATIONS

McGee, H.; *On Food and Cooking: The Science and Lore of the Kitchen*, Scribner: New York, 1984, Chapter 3, "Meat" pp. 118-178.

Grayson, M.; *Kirk-Othmer Encyclopedia of Chemical Technology*, $3^{rd}$ ed.; John Wiley & Sons: New York, 1981, vol. 15, "Meat Products", pp. 62-74.

Grayson, M.; *Kirk-Othmer Encyclopedia of Chemical Technology*, $3^{rd}$ ed.; John Wiley & Sons: New York, 1981, vol. 11, "Food Additives", pp. 146-163.

Grayson, M.; *Kirk-Othmer Encyclopedia of Chemical Technology*, $3^{rd}$ ed.; John Wiley & Sons: New York, 1981, vol. 11, "Food Processing", pp. 164-183.

Kroschwitz, J. I.; *Encyclopedia of Polymer Science and Technology*, Wiley Interscience: New Jersey, 2003, vol. 3, "Packaging, Flexible," pp. 353-363.

Kroschwitz, J. I.; *Encyclopedia of Polymer Science and Technology*, Wiley Interscience: New Jersey, 2003, vol. 2, Coextrusion pp. 1-25.

Brody, A. L.; Marsh, K. S.; *The Wiley Encyclopedia of Packaging Technology*, $2^{nd}$ ed.; John Wiley & Sons: 1997, Active Packaging, pp. 2-13.

Brody, A. L.; Marsh, K. S.; *The Wiley Encyclopedia of Packaging Technology*, $2^{nd}$ ed.; John Wiley & Sons: 1997, Coextrusions for Flexible Packaging, pp. 237-240.

Brody, A. L.; Marsh, K. S.; *The Wiley Encyclopedia of Packaging Technology*, $2^{nd}$ ed.; John Wiley & Sons: 1997, Form/Fill/Seal, Horizontal & Form/Fill/Seal, Vertical, pp. 465-470.

Brody, A. L.; Marsh, K. S.; *The Wiley Encyclopedia of Packaging Technology*, $2^{nd}$ ed.; John Wiley & Sons: 1997, Packaging of Food, pp. 699-704.

Brody, A. L.; Marsh, K. S.; *The Wiley Encyclopedia of Packaging Technology*, $2^{nd}$ ed.; John Wiley & Sons: 1997, Thermoform/Fill/Seal, pp. 910-921.

Brody, A. L.; Marsh, K. S.; *The Wiley Encyclopedia of Packaging Technology*, $2^{nd}$ ed.; John Wiley & Sons: 1997, Trays, Barrier-Foam, pp. 931-937.

Brody, A. L.; Marsh, K. S.; *The Wiley Encyclopedia of Packaging Technology*, $2^{nd}$ ed.; John Wiley & Sons: 1997, Vacuum Packaging, pp. 949-955.

Wang, P. G.; Cai, T. B.; Taniguchi, N.; *Nitric Oxide Donors*; Wiley-VCH: 2005, Chapter 1, "NO and NO Donors", pp. 3-31.

Han, J. H.; "Antimicrobial Food Packaging", in *Food Technology*, Mar. 2000, vol. 54, No. 3, pp. 56-65.

Hampe, D.; Piringer, O., "Studies on the permeation of inorganic salts through plastic films", in *Food Additives and Contaminants*, 1998, vol. 15, No. 2, pp. 209-216.

Vartianinen, J., Skytta, Enqvist, J., Ahvenainen, R., "Properties of Antimicrobial Plastics Containing Traditional Food Preservatives", in *Packaging Technology and Science*, 2003, 16, pp. 223-229.

Gasco, A.; Fruttero, R.; Sorba, G.; Di Stilo, A.; and Calvino, R., "NO donors: Focus on Furoxans Derivatives", in *Pure Appl. Chem.*, 2004, vol. 76, No. 5, pp. 973-981.

Wang, P. G.; Xian, M.; Tang, X.; Wu, X.; Wen, Z.; Cai, T.; and Janczuk, A. J., Nitric Oxide Donors: Chemical Activities and Biological Applications, *Chem. Rev.*, 2002, 102, pp. 1091-1134.

Tovar, L.; Salafranca, J.; Sanchez, C.; and Nerin, C., "Migration Studies to Assess the Safety in Use of a New Antioxidant Active Packaging", *J. Agric. Food Chem.*, 2005, 53, pp. 5270-5275.

"Migration of Toxicants, Flavors, and Odor-Active Substances from Flexible Packaging Materials to Food", *Food Technology*, Jul. 1988, pp. 95-102.

"Nitrate, Nitrite, and Nitroso Compounds in Foods", *Food Technology*, Apr. 1987, pp. 127-136.

Heaton, K.M., Corformth, D.P., Moiseev, I.V., Egbert, W.R., Carpenter, C.E. "Minimum Sodium Nitrite Levels for pinking of various cooked meats as related to use of direct or indirect-dried soy isolates in poultry rolls", *Meat Science*, 2000, 55, pp. 321-329.

Bureau, G.; Multon, J.L.; *Food Packaging Technology*, vol. 2, 1996, "Influence of the Absence of Oxygen on the Color of the Meat", pp. 239-242.

Kramlich, W.E.; Pearson, A.M.; Tauber, F.W., *Processed Meats*, The AVI Publishing Company, Inc., 1973, Chapter 1, "Introduction to Meat Processing", pp. 1-12.

Kramlich, W.E.; Pearson, A.M.; Tauber, F.W., *Processed Meats*, The AVI Publishing Company, Inc., 1973, Chapter 3, "Curing", pp. 40-60.

Meat & Deli Retailer, Mar. 2005, pp. 1-19.

Meat & Deli Retailer, Mar. 2005, pp. 22-46.

Gregerson, J.; *Meat Marketing & Technology*, Dec. 2005, "Seeing Red", p. 4.

Hisey, P.; *Meat Marketing & Technology*, Mar. 2005, "Open and shut case?", pp. 20-30.

Salvage, B.; *The National Provisioner*, Jun. 2005, "Case-ready penetration", pp. 96-105.

Schwarz, S. J.; Claus, J.R.; Wang, H.; Marriott, N.G..; Graham, P.P; Fernandes, C.F., "Inhibition of Pink Color Development in Cooked, Uncured Turkey Breast Through Ingredient Incorporation" in *Poultry Science* 1999, vol. 78, pp. 255-266.

Dymicky, M.; Fox, J.B.; Wasserm, A. E., Color Formation in Cooked Model and Meat Systems With Organic and Inorganic Compounds, in *J. Food Science* 1975, vol. 4, pp. 306-309.

Pegg, R. B.; Nitrite Curing of Meat: The N-Nitrosamine Problem and Nitrite Alternatives; in *Food & Nutrition*, Chapter 9, "Possible Substitutes for Nitrite", pp. 209-223.

USDA, 1995. Processing Inspector's Calculations Handbook (FSIS Directive 7620.3), http://fsis.usda.gov/OPPDE/rdad?FSISDirectives/7620-3.pdf. Accessed Sep. 1, 2009.

Sebranek, J. and J. Bacus, Natural and Organic Meat Products: Regulatory, Manufacturing, Marketing, Quality and Safety Issues. American Meat Science Assoc. White Paper, 2007.

McMillin, K.W. et al.; "Quality and Shelf-Life of Meat in Case-Ready Modidfied Atmosphere Packaging"; Quality Attributes of Muscle Foods; 1999; Plenum Publishers, New York.

Renerre, M. "Review: Factors involved in the discoloration of beef meat"; International Journal of Food Science & Technology; 1990; 25, pp. 613-630.

Summel, Lauren M.; "Chapter II: Review of the Literature—Myoglobin"; Ph.D. Thesis, Kansas State University; 2004.

Rizvi, Syed S. H.; "Requirements for Foods Packaged in Polymeric Films"; CRC Critical Reviews in Food Science & Nutrition; Feb. 1981; pp. 111-133.

Faustman, C. et al.; "The Biochemical Basis for Discoloration in Fresh Meat: A review"; Journal of Muscle Foods; Food & Nutrition Press, Inc.; 1990; pp. 217-233.

"The Eating Quality of Meat"; Meat Science; Pergamon Press; 5th Ed.; 1991; pp. 184-187.

Govindarajan, S.; "Fresh Meat Color"; CRC Critical Reviews in Food Technology; Sep. 1973; pp. 117-127.

Giddings, G.G.; "Symposium: The Basis of quality in Muscle Foods—The Basis of Color in Muscle Foods": Journal of Food Science; Vol, 42, No. 2; 1997; pp. 288-294.

Maddock, R.; "Color Counts"; Operations & Technology; Oct. 2004; pp. 63-65.

Hermansen, P.; "Comparison of Modified Atmosphere Versus Vacuum Packaging to Extend the Shelf Life of Retail Fresh Meat Cuts"; Reciprocal Meat Conference Proceedings; V25,'83.

Holland, G.C.; "Modified Atmospheres for Fresh Meat Distribution"; Meat Science; vol. 13(19): 1985: pp. 21-39.

Sebranek, Dr. J.G.; "'Meat is dynamic'—factors in controlled atmosphere packs"; The National Provisioner; May 10, 1986; pp. 10-16.

Kropf, D.; "Enhancing Meat Color Stability"; 56th Annual Reciprocal Meat Conference; Jun. 15-18, 2003; pp. 73-75.

Thippareddi, H. et al.; "Modified Atmosphere Packaging (MAP): Microbial Control & Quality"; FACTS National Pork Board; #04667; Oct. 2002; pp. 1-8.

Kropf, D.; "Meat Display Lighting"; FACTS National Pork Board; #04623; Feb. 2002; pp. 1-8.

Hunt, M. et al.; "Cooked Color in Pork"; FACTS National Pork Board; #01637; Mar. 2002; pp. 1-4.

Atkinson, J.L. et al.; "Biochemical studies on the discoloration of fresh meat"; Journal of Food Technology; vol. 8, pp. 51-58; 1973.

* cited by examiner

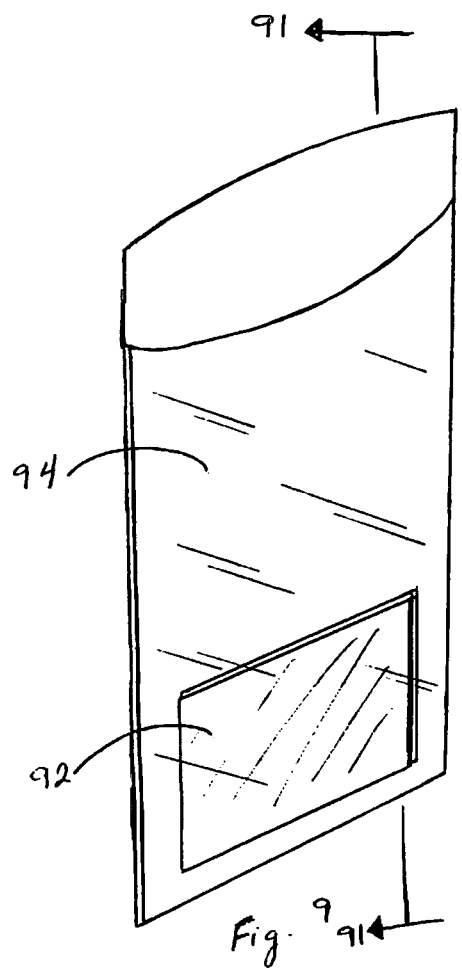
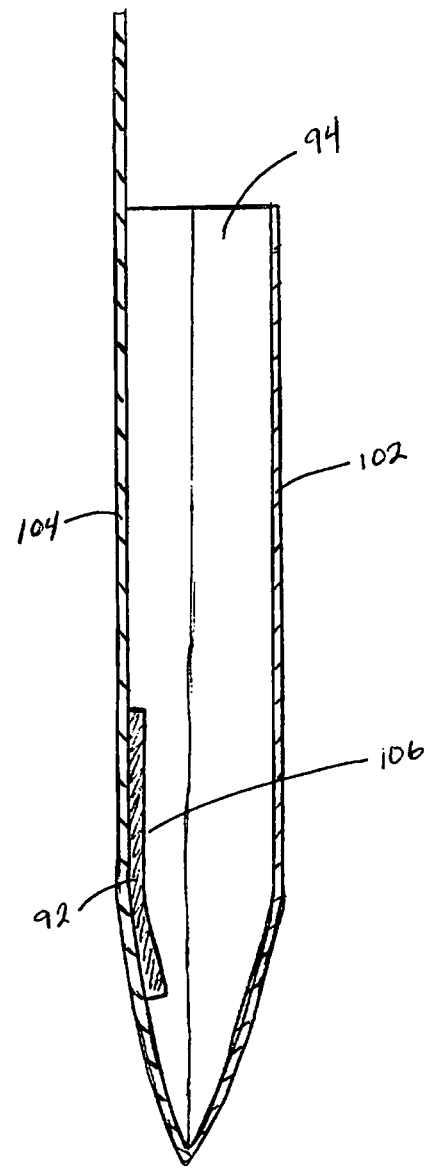
Fig. 9
Fig. 10

PACKAGING INSERTS WITH MYOGLOBIN BLOOMING AGENTS, PACKAGES AND METHODS FOR PACKAGING

RELATED APPLICATIONS

This application is a continuation-in-part of International Patent Application No. PCT/US2005/011387, filed Apr. 4, 2005, which claims the benefit of U.S. Provisional Application No. 60/559,350, filed Apr. 2, 2004, both of which are incorporated herein by reference in their entirety. This application is also a continuation-in-part of U.S. patent application Ser. No. 11/413,504, filed Apr. 28, 2006, entitled "Myoglobin Blooming Agent Containing Shrink Films"; Ser. No. 11/436,159, filed May 17, 2006, entitled "Packaging Articles, Films and Methods That Promote or Preserve the Desirable Color of Meat"; Ser. No. 11/451,968, filed Jun. 12, 2006, entitled "Myoglobin Blooming Agent, Films, Packages and Methods for Packaging" and Ser. No. 11/506,322, filed Aug. 18, 2006, entitled "Webs With Synergists That Promote or Preserve the Desirable Color of Meat," each of which is a continuation-in-part of International Patent Application No. PCT/US2005/011387, filed Apr. 4, 2005, which claims the benefit of U.S. Provisional Application No. 60/559,350, filed Apr. 2, 2004. These applications are incorporated herein by reference in their entirety.

TECHNICAL FIELD

Food packaging inserts comprising a myoglobin blooming agent, food packages, and methods of food packing comprising the same, are provided herein.

BACKGROUND

Meat color is an important quality characteristic of packaged meat products that affects their merchantability. Consumers often use color as an indicator of meat quality and freshness. The color of meat is related to the amount and chemical state of myoglobin in the meat. Myoglobin is present in the muscle tissue of all animals and functions to store and deliver oxygen by reversibly binding molecular oxygen, thereby creating an intracellular source of oxygen for the mitochondria. Pork and poultry typically contain lower amounts of myoglobin than beef and thus are lighter in color than beef.

Myoglobin includes an open binding site called heme that can bind certain small molecules, such as molecular oxygen ($O_2$ or "oxygen"), or water. Myoglobin, without a molecule bound to the heme site, is a purple colored molecule called deoxymyoglobin. The presence and type of ligand bound at the myoglobin binding site can alter the color of the myoglobin. The color of the meat product will change based on the amount of myoglobin present and the amount and type(s) of ligand molecule(s) bound to the heme binding site. Molecular oxygen readily acts as a ligand that binds to the heme group, permitting biological transport of oxygen from the blood stream to the mitochondria within cells. When oxygen binds to the heme pocket, purple deoxymyoglobin becomes oxymyoglobin, characterized by a red color. When a water molecule binds to the heme group, the myoglobin molecule turns brown and is referred to as metmyoglobin. The binding of carbon monoxide (CO) can cause a red color similar to that produced by oxygen binding. Nitric oxide (NO), when bond to the heme group, has been described as forming a stable pink color in cured meat.

Historically, fresh meat products available to consumers have been substantially prepared and packaged for end-use at the site of final sale. Product packaging that preserves a desirable color of fresh meat can promote the merchantability and appeal of the meat product for consumers. Existing meat packaging technology can inadequately preserve favorable meat color for various reasons. The conventional packaging format used by the retail grocer for fresh meat is to stretch a thin plastic film around a foam tray that supports the product. The film is permeable to oxygen so that the color of the meat quickly blooms to a bright red. However, the shelf life for the bright red color is only about three days. Thus, this packaging format is undesirable because the color often becomes unacceptable before it is sold even though the meat remains nutritious and healthy for consumption. As a result, a packaging format that maintains the fresh meat color for a longer period of time has long been sought for centralized packaging operations. Alternatively, meat has been packaged in oxygen barrier, vacuum bags, which are vacuum sealed and prevent oxygen contact with the meat until the package is opened. Vacuum sealed red meat products are nutritious, healthy and have a long shelf life, however they may result in an undesirable purple meat color in the package that does not bloom to a desirable red color until the meat is exposed to air. Consumer acceptance of meat having a purple color is less than that of meat having a red color. To provide meat with the consumer preferred red color, meat has also been packaged in a modified atmosphere package ("MAP"), wherein the meat is maintained in a sealed pocket containing an atmosphere that is different than ambient air. For example, one such commercially acceptable MAP contains an atmosphere enriched with oxygen (up to 80% by volume) to better maintain a preferred red color. Another case ready MAP maintains meat in carbon dioxide, with very low oxygen content until just before display when the meat is exposed to oxygen to cause blooming to the desired red color. Alternatively, the meat can be contacted with a MAP having an atmosphere containing a small concentration of carbon monoxide (CO) (e.g., 0.4% by volume) to maintain a preferred red meat color. However, while CO-containing MAP may maintain a shelf life comparable to vacuum packaged meat, the red color induced by the presence of CO can be perceived as "unnaturally" bright red. In addition, the red color developed by CO tends to extend through a significant portion of the meat product, causing a permanent "pinking" of the interior of the meat which may remain even after the meat has been fully cooked. The bright red CO-myoglobin complex is referred to as carboxymyoglobin. The presence of carbon monoxide can also disfavorably impact sales of CO-containing MAP packages among consumers.

One concern with modified atmosphere packaging, is that surfaces of the meat product not exposed to the modified atmosphere do not maintain the preferred color of fresh meat. For example, surfaces of the meat not exposed to the modified atmosphere may retain the deoxymyoglobin pigment and its characteristic purple color. Thus, when the package is opened, the meat cut presents both red and purple colors, which is not attractive to the consumer. What is needed are packaging methods and products which maintain the preferred color of fresh meat over all surfaces of the packaged meat cut, and which also provide consistent color after cooking.

Meat surfaces not exposed to the modified atmosphere include those surfaces covered by packaging inserts such as absorbent pads or puncture resistant patches. Absorbent pads such as soaker pads are routinely used in packaged meat products to absorb unwanted liquids that can present an unsanitary environment and an unfavorable appearance. Puncture resistant patches are used to inhibit sharp portions of the meat product, such as bone parts, from puncturing the packaging material which can compromise the contents of the package, create an unsanitary environment, as well as an unfavorable appearance. What is needed are packaging inserts which maintain the preferred color of fresh meat over surfaces of the packed meat cut which they cover or protect.

SUMMARY

In a first embodiment, a packaging insert for meat product packaging is provided comprising a first layer comprising a myoglobin blooming agent. The packaging insert is sized smaller than the meat product package to which it is to be inserted and at least a portion of the insert is in contact with the meat product. The packaging insert may further comprise a second layer, and in some aspects, a third layer. The layers may comprise a meat contact layer, and a polymeric material, a non-woven material, a paper material, an absorbent material, or a water-soluble resin. One or more layers may be liquid permeable or impermeable.

In a second embodiment, a packaged meat product is provided comprising an uncooked meat product and a packaging insert. The packaging insert comprises a first layer comprising a myoglobin blooming agent selected from the group consisting of nitric oxide donating compounds, nitrogen heterocycles, and sulfur monoxide donating compounds. The packaging insert is sized smaller than a meat product package to which it is to be inserted and at least a portion of the insert is in contact with the meat product. In some aspects, the packaged meat product further comprises a container comprising a polymeric web having an oxygen barrier polymeric layer and a food contact layer, the food contact layer has a food contact surface, at least a portion of which is in contact with at least a portion of a surface of the uncooked meat product.

In a third embodiment, a method of packaging a meat product to promote or preserve a desirable appearance of the meat product is provided. The method comprises supplying a container comprising a polymeric web having an oxygen barrier layer; providing a myoglobin-containing fresh meat product having a water content of at least 5 weight %; and providing a packaging insert comprising a first layer comprising a myoglobin blooming agent selected from the group consisting of nitric oxide donating compounds, nitrogen heterocycles, and sulfur monoxide donating compounds. The packaging insert is sized smaller than the container to which it is to be inserted and at least a portion of the insert is in contact with the myoglobin-containing fresh meat product. In some aspects, the method further comprises removing oxygen from an environment surrounding the myoglobin-containing fresh meat product; and storing the fresh meat product in a substantially oxygen free environment for a time sufficient to allow the desirable color to appear.

BRIEF DESCRIPTION OF SEVERAL VIEWS OF THE DRAWINGS

FIG. 1b shows a side view of the packaging insert of FIG. 1a.

FIG. 3b shows a side view of the packaging insert of FIG. 3a.

FIG. 9 illustrates a puncture resistant packaging insert in a bag.

FIG. 10 shows a cross-sectional view of the bag of FIG. 9 taken along lines 91-91.

DETAILED DESCRIPTION OF PREFERRED EMBODIMENTS

Definitions

Figure 1A:
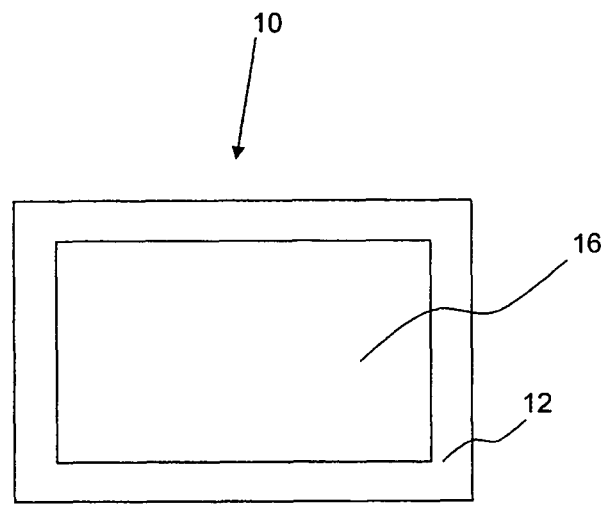
FIG. 1a shows an exemplary packaging insert of the present invention comprising a first layer disposed between second and third layers, where the first layer comprises an absorbent material.

Myoglobin includes a non-protein portion called heme and a protein portion called globin. The heme portion includes an iron atom in a planar ring. The globin portion can provide a three-dimensional structure that surrounds the heme group and stabilizes the molecule. The heme group provides an open binding site that can bind certain ligands having the proper shape and electron configuration to the iron atom. When a ligand enters and binds to the heme pocket, the electron configuration of the ligand affects light absorption characteristics of the heme group. Therefore, the presence or absence of a ligand such as oxygen in the heme pocket, and the ligand itself can result in visible color changes of myoglobin.

When there is no ligand in the heme pocket, myoglobin is called deoxymyoglobin, which has a purple color (which is sometimes characterized as purple, deep red, dark red, reddish blue or bluish red). Molecular oxygen, $O_2$ ("oxygen"), readily acts as a ligand that binds to the heme group, permitting biological transport of oxygen from the blood stream to the mitochondria within cells. When oxygen binds to the heme pocket, purple deoxymyoglobin becomes oxymyoglobin, characterized by a red color. Upon dissociation of the oxygen ligand from oxymyoglobin, the iron atom is oxidized leaving the iron in the ferric state. The oxidation of the iron atom renders the molecule incapable of normal oxygen binding. As the chemical state of iron can change from ferrous ($Fe^{2+}$) to ferric ($Fe^{3+}$), the three-dimensional structure of the globin part can change in a manner that allows water molecules to bind to the heme pocket. Binding of a water molecule in the ferric iron containing heme pocket affects light absorption of the heme pocket. The oxidized form of myoglobin with a water molecule in the heme group is referred to as metmyoglobin and its color is brown. The oxidation of the iron atom is believed to result in a brown color. Heme ligands other than oxygen or water may also affect meat color. For example, the presence of carbon monoxide (CO) may cause fresh meat to have a desirable bright red color similar to oxygen. Although it has been suggested that nitric oxide (NO) can cause a dull red color (or stable pink color in the case of cured meat which also contains sodium chloride), it has been discovered that in the absence of oxygen, NO may produce a desired bright red color similar to that caused by oxygen in uncooked meat, especially in fresh, raw, unprocessed or uncured meat. It has been discovered that the development of this desired bright red color may take many hours and typically may take from 1 to 5 days and that initially, the meat color in a vacuum package having an oxygen barrier may turn to an undesirable brown until the unexpected transformation to the desired red takes place.

Other variables that affect the stability of the globin portion also affect the affinity of the heme group for oxygen and the tendency of the chemical state of the iron atom to become oxidized. Acidity and high temperature, such as that associated with cooking, can denature the globin part thus leading to instability of the heme group. In the absence of stabilizing ligands, the oxidation of the heme iron is automatic when the globin is denatured.

A "myoglobin blooming agent" refers to any agent (or precursor thereof) that binds to or interacts with any undenatured myoglobin-containing structure (including but not limited to deoxymyoglobin, oxymyoglobin, metmyoglobin, carboxymyoglobin, and nitroxymyoglobin) present in a fresh meat product to produce or preserve a desired color, such as a red color indicative of fresh meat. The myoglobin blooming agent may also interact or cause an interaction with hemoglobin present in a meat product so as to produce, maintain or enhance, i.e., "fix" a desired color. Thus, the myoglobin blooming agent is not a color additive, but it acts as a color fixative. Examples of myoglobin blooming agents include gases such as oxygen and carbon monoxide.

"Deoxymyoglobin" refers to myoglobin in which no oxygen is present in the heme pocket. The heme iron atom is in the reduced ferrous state. It is theorized that a liquid water molecule is the ligand in the heme pocket. Deoxymyoglobin is associated with the unbloomed purple pigment of fresh meat.

"Oxymyoglobin" refers to the oxygenated form of deoxymyoglobin where the heme ligand is an oxygen gas molecule. Oxymyoglobin is associated with the bloomed red pigment of fresh meat "Metmyoglobin" refers to an oxidized form of myoglobin in which the heme iron is in the oxidized ferric state. Metmyoglobin can be formed when oxygen leaves the heme pocket of oxymyoglobin and takes an electron with it leaving the heme iron atom in the oxidized ferric state. Metmyoglobin causes the characteristic oxidized brown pigment of fresh meat.

"Carboxymyoglobin" refers to the undenatured reduced form of the carboxylated deoxymyoglobin pigment where the heme ligand is carbon monoxide. The color of carboxymyoglin is red.

"Nitroxymyoglobin" is the undenatured reduced form of the nitrosylated deoxymyoglobin pigment. The heme ligand is a nitrogen monoxide (NO) molecule. Nitrogen monoxide is also referred to as nitric oxide. Nitroxymyoglobin is also referred to as nitric oxide myoglobin, nitrosohaemachromagen, or nitrosomyoglobin among others. Nitroxymyoglobin has the same red color as oxymyoglobin and carboxymyoglobin.

"Nitric oxide metmyoglobin" is the undenatured oxidized form of deoxymyoglobin when nitrite is present. It is used to describe the brown color of meat that typically occurs after nitrite is added during the curing process.

"Nitrosohemochrome" refers to the nitrosylated protoporphyrin (heme complex) that is detached from the globin protein moiety of the myoglobin molecule. Nitrosohemochrome affords the stable pink to maroon color of cooked cured processed meat, wherein the heme iron is in the reduced state.

In fresh meat (postmortem muscle tissue), oxygen can continually associate and disassociate from the heme complex of the undenatured myoglobin molecule. It is the relative abundance of three forms of the undenatured muscle pigment that determines the visual color of fresh meat. They include purple deoxymyoglobin (reduced myoglobin), red oxymyoglobin (oxygenated myoglobin); and brown metmyoglobin (oxidized myoglobin). The deoxymyoglobin form typically predominates immediately after the animal is slaughtered. Thus, freshly cut meat can have a purple color. This purple color can persist for a long time if the pigment is not exposed to oxygen. Cutting or grinding exposes the pigment to oxygen in the atmosphere, and the purple color can quickly convert to either bright red (oxymyoglobin) or brown (metmyoglobin). Thus, although deoxymyoglobin is technically indicative of fresher meat, it is the red or "bloomed" meat color that consumers use as their primary criterion for perceiving freshness. It is believed without wishing to be bound by the belief, that the preferred red color of fresh meat occurs when at least 50% of the deoxymyoglobin molecules are oxygenated to the oxymyoglobin state. Changes in the relative percentage of each of these forms can continue to occur as fresh meat is exposed to oxygen for longer periods of time. The immediate conversion of the purple color to the desirable bright red or undesirable brown can depend on the partial pressure of oxygen at the surface. The purple color is favored at the very low oxygen level, and can dominate at oxygen levels of 0-0.2% by volume. The brown color is favored when the oxygen level is only slightly higher (0.2% to 5.0% by volume). Consumer discrimination typically begins when the relative amount of metmyoglobin is 20%. A distinctly brown color is evident at 40% metmyoglobin, which typically renders the meat unsaleable even though it remains nutritious and healthy for consumption.

Certain biochemical reactions that occur in muscle tissue after death can also affect fresh meat color, such as the presence of active glycolytic enzymes that convert oxygen to carbon dioxide. Reducing coenzymes called metmyoglobin reductases present in meat convert metmyoglobin back to deoxymyoglobin, and their activity is called "MRA" which is an abbreviation for metmyoglobin reducing activity. MRA can be described as the ability of muscle to reduce metmyoglobin back to its natural deoxymyoglobin state. MRA is lost when the oxidizable substrates are depleted or when heat or acid denatures the enzymes. When the enzymes lose their activity or are denatured, the iron of the heme pigment automatically oxidizes to the metmyoglobin form, and the brown color stabilizes and dominates. MRA persists for a period of time after death depending on the amount of exposure of the meat tissue to oxygen. During this time, oxygen is continually consumed by the meat tissue. The oxygen consumption rate is referred to as "OCR". When meat that has a high OCR is exposed to oxygen, the oxygen tension is reduced so rapidly that the metmyoglobin is favored below the viewing surface. If it is close to the viewing surface, the perceived color of the meat is affected. The MRA is important to minimize this layer of metmyoglobin that forms between the bloomed surface and purple interior. As the MRA wears out, the brown metmyoglobin layer thickens and migrates toward the surface, thus terminating display life. When the MRA is high, the metmyoglobin layer is thin and sometimes not visible to the naked eye.

MRA and OCR relate to determining the types of packaging best suited for retail sale in order to prolong the desirable appearance of meat as long as possible. Hermetically sealed packages with films that are a barrier to oxygen will cause a low oxygen tension on the meat surface. Thus, metmyoglobin formation occurs and the viewing surface changes to an undesirable brown color. However, if the OCR is high enough to keep ahead of the oxygen that migrates across the packaging film, and the MRA is good enough to reduce metmyoglobin that forms on the surface, then native deoxymyoglobin replaces metmyoglobin. After a period of time, the perceived color changes from brown to purple. Both of these colors are unacceptable to the consumer. For this reason, vacuum packaging by itself has historically been an unacceptable format for case ready fresh meat although it is used to ship subprimal and other large cuts of meat from the slaughterhouse to retail butchers for further processing and re-packaging. On the other hand, vacuum packaging is the format of choice for cooked and cured processed meats where the myoglobin pigment is denatured by heat. Heat from cooking causes the globin portion of the nitrosylated myoglobin molecule to denature and separate from the heme portion. It is the dissociated nitrosylated heme complex that gives cured and processed meats their characteristic color. When oxygen is eliminated from a cured processed meat package, the product's color and flavor can deteriorate slower than when oxygen is present. In the present invention, it is advantageous to reduce or eliminate oxygen from the environment of the raw fresh meat in order to maximize the development of the preferred red color. A certain amount of oxygen may penetrate the meat after slaughter and fabrication. This oxygen is eliminated by the OCR/MRA activities. Similarly, those activities facilitate the dominance of the deoxymyoglobin form of the myoglobin molecule. It is believed, but not wishing to be bound by the belief, that the OCR/MRA activities also facilitate the reduction of nitrite to nitric oxide when sodium nitrite is used as the myoglobin blooming agent. In this case, the formation of deoxymyoglobin and nitric oxide allows for development of nitroxymyoglobin. Oxygen itself is a myoglobin blooming agent because it causes the formation of oxymyoglobin as described earlier herein. However, oxygen interferes with the reactions that form deoxymyoglobin and nitric oxide. Therefore, it may interfere with the bloomed color development in the presence of nitrite. Thus, it is a preferred aspect of the present invention that an oxygen barrier layer is selected and configured to protect the meat surface from the ingress of atmospheric oxygen during the formation of the desired bloomed meat color.

The term "superabsorbent" refers to a special group of polymers that have the ability to absorb many times their own mass of liquid. Superabsorbents are configured to swell very rapidly in liquid, but not dissolve.

The term "meltblown fibers" means fine fibers of unoriented polymer. Meltblown fibers are microfibers which may be continuous or discontinuous, and are generally smaller than 10 microns in average diameter. A process for making meltblow fibers is described in U.S. Pat. No. 3,849,241.

In discussing plastic packaging inserts or webs, various polymer acronyms are used herein and they are listed below. Also, in referring to blends of polymers, a colon (:) will be used to indicate that the components to the left and right of the colon are blended. In referring to web structures, a slash "/" will be used to indicate that components to the left and right of the slash are in different layers and the relative position of components in layers may be so indicated by use of the slash to indicate web layer boundaries. Acronyms commonly employed herein include:

EAA—Copolymer of ethylene with acrylic acid
EAO—Copolymers of ethylene with at least one α-olefin
EBA—Copolymer of ethylene with butyl acrylate
EEA—Copolymer of ethylene with ethyl acrylate
EMA—Copolymer of ethylene with methyl acrylate
EMAA—Copolymer of ethylene with methacrylic acid
EVA—Copolymer of ethylene with vinyl acetate
EVOH—A saponified or hydrolyzed copolymer of ethylene and vinyl acetate
PB—Polybutylene-1 (a butylene homopolymer and/or copolymer of a major portion of butylene-1 with one or more α-olefins; also known as butene-1)
PE—Polyethylene (an ethylene homopolymer and/or copolymer of a major portion of ethylene with one or more α-olefins)
PP—Polypropylene homopolymer or copolymer
PET—Poly(ethylene terephthalate)
PETG—glycol-modified polyethylene terephthalate
PLA—Polylactic acid; also known as polylactide
PVDC—Polyvinylidene chloride (also includes copolymers of vinylidene chloride, especially with vinyl chloride and/or methyl acrylate (MA)), also referred to as saran.

A "core layer," as used herein, refers to a layer positioned between and in contact with at least two other layers.

An "outer layer," as used herein is a relative term and needs not be a surface layer.

The term "exterior layer" refers to a layer comprising the outermost surface of a web or product. For example, an exterior layer can form the exterior surface of a package that contacts the exterior layer of another package during overlapping heat sealing of two packages.

The term "interior layer" refers to a layer comprising the innermost surface of a web or product. For example, an interior layer forms the interior surface of an enclosed package. The interior layer can be the food-contact layer and/or the sealant layer.

As used herein, the term "barrier," and the phrase "barrier layer," as applied to web and/or web layers, are used with reference to the ability of a web or web layer to serve as a barrier to one or more gases or moisture.

As used herein, the term "cellulose" is used to include any natural or synthetic material comprising paper fibers, wood fibers, wood pulp or powder and the like, preferably cellulosic fibers such as rayon, lyocell, cellulose acetate, cellulose carbamate, and deacetylated cellulose acetate, and regenerated cellulose, e.g., cellophane.

The term "nonwoven" as used herein refers to nonwoven papers, fabrics, or textiles and includes spunbonded webs, dry lay webs, and wet lay webs. Nonwovens are made from natural or synthetic fibers bound together in a web. "Nonwoven web" refers to a web that has a structure of individual fibers or threads which are interlaid, but not in any regular, repeating manner. Nonwoven webs may be formed by a variety of processes, such as for example, meltblowing processes, spunbonding processes and bonded carded web processes.

The term "nanocomposite" shall mean a mixture that includes a polymer, or copolymer having dispersed therein a plurality of individual platelets which may be obtained from exfoliated modified clay and having oxygen barrier properties.

The term "adhesive layer," or "tie layer," refers to a layer or material placed on one or more layers to promote the adhesion of that layer to another surface. Preferably, adhesive layers are positioned between two layers of a multilayer film to maintain the two layers in position relative to each other and prevent undesirable delamination. Unless otherwise indicated, an adhesive layer can have any suitable composition that provides a desired level of adhesion with the one or more surfaces in contact with the adhesive layer material. Optionally, an adhesive layer placed between a first layer and a second layer in a multilayer web may comprise components of both the first layer and the second layer to promote simultaneous adhesion of the adhesive layer to both the first layer and the second layer to opposite sides of the adhesive layer. Tie or adhesive layers may be incorporated into the article by any of the well known processes for making multilayer structures such as coextrusion, adhesive lamination and the like.

As used herein, the phrases "seal layer," "sealing layer," "heat seal layer," and "sealant layer," refer to an outer web layer, or layers, involved in the sealing of the web: to itself; to another film layer of the same film or another web; and/or to another article which is not a web, e.g., a tray. In general, the sealant layer is a surface layer, i.e., an exterior or an interior layer of any suitable thickness, that provides for the sealing of the web to itself or another layer. With respect to packages having only fin-type seals, as opposed to lap-type seals, the phrase "sealant layer" generally refers to the interior surface film web of a package. The inside layer frequently can also serve as a food contact layer in the packaging of foods.

"Food contact layer," "food contact portion" or "food contact surface" refers to the portion of a packaging material that contacts a packaged meat product. Preferably, the food packaging film includes a food contact layer. At least one of a food contact layer or non-food contact layer comprises a myoglobin blooming agent in an amount effective to promote or preserve the desirable appearance or color of the meat product.

As used herein, the term "lamination", and the phrase "laminated film", refer to the process, and resulting product, made by bonding together two or more webs or other materials. Lamination can be accomplished by joining webs together with adhesives, joining with heat and pressure, and even spread coating and extrusion coating. The term laminate is also inclusive of coextruded multilayer webs comprising one or more tie layers.

"Polyolefin" is used herein broadly to include polymers such as polyethylene, ethylene-alpha olefin copolymers (EAO), polypropylene, polybutene, and ethylene copolymers having a majority amount by weight of ethylene polymerized with a lesser amount of a comonomer such as vinyl acetate, and other polymeric resins falling in the "olefin" family classification. Polyolefins may be made by a variety of processes well known in the art including batch and continuous processes using single, staged or sequential reactors, slurry, solution and fluidized bed processes and one or more catalysts including for example, heterogeneous and homogeneous systems and Ziegler, Phillips, metallocene, single site and constrained geometry catalysts to produce polymers having different combinations of properties. Such polymers may be highly branched or substantially linear and the branching, dispersity and average molecular weight may vary depending upon the parameters and processes chosen for their manufacture in accordance with the teachings of the polymer arts.

"Polyethylene" is the name for a polymer whose basic structure is characterized by the chain —$(CH_2-CH_2-)_n$. Polyethylene homopolymer is generally described as being a solid which has a partially amorphous phase and partially crystalline phase with a density of between 0.860 to 0.970 g/cm$^3$. The relative crystallinity of polyethylene is known to affect its physical properties. The amorphous phase imparts flexibility and high impact strength while the crystalline phase imparts a high softening temperature and rigidity.

Unsubstituted polyethylene is generally referred to as high density homopolymer and has a crystallinity of 70 to 90 percent with a density between about 0.96 to 0.97 g/cm$^3$. Most commercially utilized polyethylenes are not unsubstituted homopolymer but instead have $C_2$-$C_8$ alkyl groups attached to the basic chain. These substituted polyethylenes are also known as branched chain polyethylenes. Also, commercially available polyethylenes frequently include other substituent groups produced by copolymerization. Branching with alkyl groups generally reduces crystallinity, density and melting point. The density of polyethylene is recognized as being closely connected to the crystallinity. The physical properties of commercially available polyethylenes are also affected by average molecular weight and molecular weight distribution, branching length and type of substituents.

People skilled in the art generally refer to several broad categories of polymers and copolymers as "polyethylene." Placement of a particular polymer into one of these categories of "polyethylene" is frequently based upon the density of the "polyethylene" and often by additional reference to the process by which it was made since the process often determines the degree of branching, crystallinity and density. In general, the nomenclature used is nonspecific to a compound but refers instead to a range of compositions. This range often includes both homopolymers and copolymers.

For example, "high density" polyethylene (HDPE) is ordinarily used in the art to refer to both (a) homopolymers of densities between about 0.960 to 0.970 g/cm$^3$ and (b) copolymers of ethylene and an alpha-olefin (usually 1-butene or 1-hexene) which have densities between 0.940 and 0.958 g/cm$^3$. HDPE includes polymers made with Ziegler or Phillips type catalysts and is also said to include high molecular weight "polyethylenes." In contrast to HDPE, whose polymer chain has some branching, are "ultra high molecular weight polyethylenes" which are essentially unbranched specialty polymers having a much higher molecular weight than the high molecular weight HDPE.

Hereinafter, the term "polyethylene" will be used (unless indicated otherwise) to refer to ethylene homopolymers as well as copolymers of ethylene with alpha-olefins and the term will be used without regard to the presence or absence of substituent branch groups.

Another broad grouping of polyethylene is "high pressure, low density polyethylene" (LDPE). LDPE is used to denominate branched homopolymers having densities between 0.915 and 0.930 g/cm$^3$. LDPEs typically contain long branches off the main chain (often termed "backbone") with alkyl substituents of 2 to 8 carbon atoms or more.

Linear Low Density Polyethylenes (LLDPEs) are copolymers of ethylene with alpha-olefins having densities from 0.915 to 0.940 g/cm$^3$. The alpha-olefin utilized is usually 1-butene, 1-hexene, or 1-octene and Ziegler-type catalysts are usually employed (although Phillips catalysts are also used to produce LLDPE having densities at the higher end of the range, and metallocene and other types of catalysts are also employed to produce other well known variations of LLDPEs).

Ethylene α-olefin copolymers (EAOs) are copolymers having an ethylene as a major component copolymerized with one or more alpha olefins such as octene-1, hexene-1, or butene-1 as a minor component. EAOs include polymers known as LLDPE, VLDPE, ULDPE, and plastomers and may be made using a variety of processes and catalysts including metallocene, single-site and constrained geometry catalysts as well as Ziegler-Natta and Phillips catalysts.

Very Low Density Polyethylenes (VLDPEs) which are also called "Ultra Low Density Polyethylenes" (ULDPEs) comprise copolymers of ethylene with alpha-olefins, usually 1-butene, 1-hexene or 1-octene and are recognized by those skilled in the art as having a high degree of linearity of structure with short branching rather than the long side branches characteristic of LDPE. However, VLDPEs have lower densities than LLDPES. The densities of VLDPEs are recognized by those skilled in the art to range between 0.860 and 0.915 g/cm$^3$. A process for making VLDPEs is described in European Patent Document publication number 120,503 whose text and drawing are hereby incorporated by reference into the present document. Sometimes VLDPEs having a density less than 0.900 g/cm$^3$ are referred to as "plastomers".

Polyethylenes may be used alone, in blends and/or with copolymers in both monolayer and multilayer webs for packaging applications for such food products as poultry, fresh red meat and processed meat.

As used herein, the term "modified" refers to a chemical derivative, e.g., one having any form of anhydride functionality, such as anhydride of maleic acid, crotonic acid, citraconic acid, itaconic acid, fumaric acid, etc., whether grafted onto a polymer, copolymerized with a polymer, or otherwise functionally associated with one or more polymers, and is also inclusive of derivatives of such functionalities, such as acids, esters, and metal salts derived therefrom. Another example of a common modification is acrylate modified polyolefin.

As used herein, terms identifying polymers, such as, e.g., "polyamide" or "polypropylene," are inclusive of not only polymers comprising repeating units derived from monomers known to polymerize to form a polymer of the named type, but are also inclusive of comonomers, as well as both unmodified and modified polymers made by, e.g., derivitization of a polymer after its polymerization to add functional groups or moieties along the polymeric chain. Furthermore, terms identifying polymers are also inclusive of "blends" of such polymers. Thus, the terms "polyamide polymer" and "nylon polymer" may refer to a polyamide-containing homopolymer, a polyamide-containing copolymer or mixtures thereof.

The term "polyamide" means a high molecular weight polymer having amide linkages (—CONH—)$_n$ which occur along the molecular chain, and includes "nylon" resins which are well known polymers having a multitude of uses including utility as packaging inserts, webs, films, sheets, bags, and casings. See, e.g., *Modern Plastics Encyclopedia*, 88 Vol. 64, No. 10A, pp 34-37 and 554-555 (McGraw-Hill, Inc., 1987) which is hereby incorporated by reference. Polyamides are preferably selected from nylon compounds approved for use in producing articles intended for use in processing, handling, and packaging food.

The term "nylon" as used herein refers more specifically to synthetic polyamides, either aliphatic or aromatic, either in crystalline, semi-crystalline, or amorphous form characterized by the presence of the amide group —CONH. It is intended to refer to both polyamides and co-polyamides.

Thus the terms "polyamide" or "nylon" encompass both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Preferably, polymers are selected from compositions approved as safe for producing articles intended for use in processing, handling and packaging of food, such as nylon resins approved by the U.S. Food and Drug Administration provided at 21 CFR §177.1500 ("Nylon resins"), which is incorporated herein by reference. Examples of these nylon polymeric resins for use in food packaging and processing include: nylon 6,6, nylon 6,10, nylon 6,6/6,10, nylon 6/6,6, nylon 11, nylon 6, nylon 6,6T, nylon 6,12, nylon 12, nylon 6/12, nylon 6/6,9, nylon 4,6, nylon 6-3-T, nylon MXD-6, nylon MXDI, nylon 12T and nylon 6I/6T disclosed at 21 CFR §177.1500. Examples of such polyamides include nylon homopolymers and copolymers such as those selected form the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 6,6/6,10 (e.g., manufactured by the condensation of mixtures of nylon 6,6 salts and nylon 6,10 salts), nylon 6/6,9 resins (e.g., manufactured by the condensation of epsilon-caprolactam, hexamethylenediamine and azelaic acid), nylon 11 (polyundecanolactam), nylon 12 (polylauryllactam) and copolymers or mixtures thereof.

In use of the term "amorphous nylon copolymer," the term "amorphous" as used herein denotes an absence of a regular three-dimensional arrangement of molecules or subunits of molecules extending over distances which are large relative to atomic dimensions. However, regularity of structure may exist on a local scale. See, "Amorphous Polymers," Encyclopedia of Polymer Science and Engineering, 2nd Ed., pp. 789-842 (J. Wiley & Sons, Inc. 1985). In particular, the term "amorphous nylon copolymer" refers to a material recognized by one skilled in the art of differential scanning calorimetry (DSC) as having no measurable melting point or no heat of fusion (less than 0.5 cal/g) as measured by DSC using ASTM 3417-83. The amorphous nylon copolymer may be manufactured by the condensation of hexamethylenediamine, terephthalic acid, and isophthalic acid according to known processes. Amorphous nylons also include those amorphous nylons prepared from condensation polymerization reactions of diamines with dicarboxylic acids. For example, an aliphatic diamine is combined with an aromatic dicarboxylic acid, or an aromatic diamine is combined with an aliphatic dicarboxylic acid to give suitable amorphous nylons.

As used herein, "EVOH" refers to ethylene vinyl alcohol copolymer. EVOH is otherwise known as saponified or hydrolyzed ethylene vinyl acetate copolymer, and refers to a vinyl alcohol copolymer having an ethylene comonomer. EVOH is prepared by the hydrolysis (or saponification) of an ethylene-vinyl acetate copolymer. The degree of hydrolysis is preferably from about 50 to 100 mole percent, more preferably, from about 85 to 100 mole percent, and most preferably at least 97%. It is well known that to be a highly effective oxygen barrier, the hydrolysis-saponification must be nearly complete, i.e., to the extent of at least 97%. EVOH is commercially available in resin form with various percentages of ethylene and there is a direct relationship between ethylene content and melting point. For example, EVOH having a melting point of about 175° C. or lower is characteristic of EVOH materials having an ethylene content of about 38 mole % or higher. EVOH having an ethylene content of 38 mole % has a melting point of about 175° C. With increasing ethylene content the melting point is lowered. A melting point of about 158° C. corresponds to an ethylene content of 48 mole %. EVOH copolymers having lower or higher ethylene contents may also be employed. It is expected that processability and orientation would be facilitated at higher contents; however, gas permeabilities, particularly with respect to oxygen, may become undesirably high for certain packaging applications which are sensitive to microbial growth in the presence of oxygen. Conversely, lower contents may have lower gas permeabilities, but processability and orientation may be more difficult.

As used herein, the term "polyester" refers to synthetic homopolymers and copolymers having ester linkages between monomer units which may be formed by condensation polymerization methods. Polymers of this type are preferably aromatic polyesters and more preferably, homopolymers and copolymers of polyethylene terephthalate, polyethylene isophthalate, polybutylene terephthalate, polyethylene naphthalate and blends thereof. Suitable aromatic polyesters may have an intrinsic viscosity between 0.60 to 1.0, preferably between 0.60 to 0.80.

As used herein, the term "ionomer" refers to an ionic copolymer formed from an olefin and an ethylenically unsaturated monocarboxylic acid having the carboxylic acid moieties partially neutralized by a metal ion. Suitable metal ions may include, but are not limited to, sodium, potassium, lithium, cesium, nickel, and zinc. Suitable carboxylic acid comonomers may include, but are not limited to, ethylene/methacrylic acid, succinic acid, itaconic acid, vinyl acetate/methacrylic acid, methyl/methacrylate/methacrylic acid, styrene/methacrylic acid and combinations thereof. Useful ionomer resins may include an olefinic content of at least 50% (mol) based upon the copolymer and a carboxylic acid content of between 5-25% (mol) based upon the copolymer. Useful ionomers are also described in U.S. Pat. No. 3,355,319 to Rees, which is incorporated herein by reference in its entirety.

Myoglobin Blooming Agents

A "myoglobin blooming agent" refers to any agent (or precursor thereof) that binds to or interacts with any undenatured myoglobin-containing structure (including but not limited to deoxymyoglobin, oxymyoglobin, metmyoglobin, carboxymyoglobin, and nitric oxide myoglobin) present in a fresh meat product to produce or preserve a desired color, such as a red color indicative of fresh meat. The myoglobin blooming agent may also interact or cause an interaction with hemoglobin present in a meat product so as to produce, maintain or enhance, i.e., "fix" a desired color. Thus, the myoglobin blooming agent is not a color additive, but it acts as a color fixative.

In one preferred embodiment, the myoglobin blooming agent is a "nitric oxide donating compound" ("NO donor") that provides a nitric oxide (NO) molecule that binds to the myoglobin present in a meat product so as to maintain or promote a reddening or blooming or other favorable coloration of the meat product. A nitric oxide donating compound releases nitric oxide or is a precursor, e.g., nitrate which acts as an intermediate leading to the formation of nitric oxide which binds to a myoglobin molecule in a meat product. Examples of nitric oxide donating compounds include nitrosodisulfonates including for example, Fremy's salt [NO(SO$_3$Na)$_2$ or NO(SO$_3$K)$_2$]; inorganic nitrates (MNO$_3$) where a suitable counter ion (M$^+$) include alkali metals (e.g., sodium, potassium), alkaline earth metals (e.g., calcium), transition metals, protonated primary, secondary, or tertiary amines, or quaternary amines, or ammonium, and including for example, saltpeter; and inorganic nitrites (MNO$_2$) where suitable counter ions (M$^+$) include alkali metals (e.g., sodium, potassium), alkaline earth metals (e.g., calcium), transition metals, protonated primary, secondary, or tertiary amines, or quaternary amines, or ammonium.

Other suitable nitric oxide donating compounds that may act as myoglobin blooming agents are disclosed in U.S. Pat. No. 6,706,274 to Herrmann et al. (filed Jan. 18, 2001); U.S. Pat. No. 5,994,444 to Trescony et al. (filed Oct. 16, 1997), and U.S. Pat. No. 6,939,569 to Green et al. (filed Jun. 18, 1999), as well as published U.S. Patent Application No. US2005/0106380 by Gray et al. (filed Nov. 13, 2003), all of which are hereby incorporated by reference herein. Optionally, the myoglobin blooming agents can contain materials that promote the conversion of other materials to NO, such as nitrate reductase or nitrosothiol reductase catalytic agents, including the materials described in WIPO Publication No. WO 02/056904 by Meyerhoff et al. (filed Jan. 16, 2002), which is incorporated herein by reference.

Other examples of nitric oxide donating compounds include organic nitroso compounds (containing a —NO functional group attached to carbon) including 3-ethyl-3-nitroso-2,4-pentanedione; organic nitro compounds (containing a —NO$_2$ functional group attached to carbon) including nitroglycerine and 6-nitrobenzo[α]pyrene; organic nitrates (—O—NO$_2$) including ethyl nitrate, glyceryl mono, di or trinitrate, pentaerythritol tetranitrate, erythrityle tetranitrate, isosorbide mono or dinitrate, and trolnitrate.

Other examples of nitric oxide donating compounds include O-nitrosylated compounds (—O—NO) including alkyl nitrites such as butyl nitrite, amyl nitrite, dodecyl nitrite and dicyclohexylamine nitrite; S-nitrosylated compounds (—S—NO) also known as nitrosothiols including S-nitrosothioglycerol, S-nitroso-penicillamine, S-nitrosoglutathione, glutathione, S-nitroylated derivatives of captopril, S-nitrosylated-proteins, S-nitrosylated-peptides, S-nitrosylated-oligosaccharides and S-nitrosylated-polysaccharides; and N-nitrosylated compounds (—N—NO) including N-nitrosamines; N-hydroxy-N-nitrosoamines; and N-nitrosimines.

Additional examples of nitric oxide donating compounds include nonoate compounds which include the functional group —N(O)—NO (also referred to in the art as N-oxo-N-nitroso compounds, N-hydroxy-N'-diazenium oxides, diazeniumdiolates and NONOates) including 3,3,4,4-tetramethyl-1,2-diazetine 1,2-dioxide.

Further examples of nitric oxide donating compounds include transition metal/nitroso complexes including sodium nitroprusside, dinitrosyl iron thiol complexes, iron-sulfur cluster nitrosyls, ruthenium nitrosyls, nitroso/heme/transition metal complexes, and nitroso ferrous protoporphyrin complexes; furoxans including 1,2,5-oxadiazole N-oxide; benzofuroxans, oxatriazole-5-imines including 3-aryl-1,2,3,4-oxatriazole-5-imine; sydnonimines including molsidomine; oximes including cyclohexanone oxime; hydroxylamines, N-hydroxyguanidines, and hydroxyureas.

Nitric oxide donating compounds may donate one molecule of nitric oxide or multiple nitric oxide molecules. In some aspects the nitric oxide donating compound may be a polymeric material which contains several nitric oxide donating sites, and can thereby release multiple molecules of nitric oxide. Preferably, the nitric oxide is released from the polymeric chain. For example, U.S. Pat. No. 5,525,357, which is hereby incorporated by reference herein, describes a polymer with a nitric oxide-releasing functional group bound to the polymer. U.S. Pat. No. 5,770,645, which is hereby incorporated by reference herein, describes a polymer in which NO$_x$ is covalently bound to a polymer by a linking group. U.S. Pat. No. 6,087,479, which is hereby incorporated by reference herein, describes synthetically derived polymeric materials which are derivatized to include nitric oxide adducts. It is to be understood that polymeric materials which contain a nitric oxide donating compound or nitric oxide donating functional group chemically bound to the polymer chain are within the scope of the present invention.

In one embodiment, the nitric oxide donating compound is other than sodium nitrate or sodium nitrite.

In one embodiment, the nitric oxide donating compound is other than an inorganic nitrate or inorganic nitrite.

In another embodiment, the nitric oxide donating compound is an inorganic nitrate or inorganic nitrite other than sodium nitrate, potassium nitrate, sodium nitrite and potassium nitrate.

In one embodiment, the nitric oxide donating compound is other than a nitrosodisulfonate.

Other myoglobin blooming agents within the scope of the present invention include inorganic cyanides (MCN) where suitable counter ions ($M^+$) include alkali metals (e.g., sodium, potassium), alkaline earth metals (e.g., calcium), transition metals, protonated primary, secondary, or tertiary amines, or quaternary amines, or ammonium; inorganic fluorides (MF) where suitable counter ion ($M^+$) include alkali metals (e.g., sodium, potassium), alkaline earth metals (e.g., calcium), transition metals, protonated primary, secondary, or tertiary amines, or quaternary amines, or ammonium; isothiocyanates including mustard oil; bacterial cultures that fix nitrogen to provide a source of nitrogen oxide including xanthine oxidase, nitrate reductases, nitrite reductases; betanine; erythrocine; and cochineal extracts.

Other myoglobin blooming agents include nitrogen heterocycles and derivatives. Examples of suitable nitrogen heterocycles include pyridines, pyrimidines (for example dipyridamole), pyrazines, triazines, purines (for example nicotinamide), nicotinates, niacin (also known as nicotinic acid), isoquinolines, imidazoles and derivatives and salts thereof. It is to be understood that these nitrogen heterocycles may be substituted or unsubstituted. For pyridines and isoquinolines, 3-carbonyl substituted compounds are preferred. Preferably, the nitrogen heterocycle is a pyridine, pyrimidine or imidazole. More preferably, the nitrogen heterocycle is an alkali or alkaline earth metal salt or ester of nicotinic acid which may include such esters as methyl nicotinate, ethyl nicotinate, propyl nicotinate, butyl nicotinate, pentyl nicotinate, hexyl nicotinate, methyl isonicotinate, isopropyl isonicotinate, and isopentyl isonicotinate. More preferably the nitrogen heterocycle is an alkali or alkaline earth metal salt or ester of nicotinamide. In another aspect, the nitrogen heterocycle is pyridine, pyrimidine, histidine, N-acetyl histidine, 3-butyroylpyridine, 3-valeroylpyridine, 3-caproylpyridine, 3-heptoylpyridine, 3-capryloylpyridine, 3-formylpyiridine, nicotinamide, N-ethylnicotinamide, N,N-diethylnicotinamide, isonicotinic acid hydrazide, 3-hydroxypyridine, 3-ethyl pyridine, 4-vinyl pyridine, 4-bromo-isoquinoline, 5-hydroxyisoquinoline, or 3-cyanopyridine.

Myoglobin blooming agents also include any compound which acts as a ligand for myoglobin and leads to the formation of the desirable color, or any compound which acts as a substrate leading to the formation of such a ligand. For example, the myoglobin blooming agent can be a carbon monoxide donating compound. Carbon monoxide is known to complex with the heme pocket of myoglobin to form a desirable appearance in meat. A carbon monoxide donating compound is any compound that releases carbon monoxide or acts as a substrate leading to the formation of carbon monoxide. Alternatively, the blooming agent can be a sulfur monoxide (SO) donating compound, a nitrous oxide ($N_2O$) donating compound, an ammonia ($NH_3$) donating compound or a hydrogen sulfide donating compound. Such compounds donate the specified ligand or act as a substrate leading to the formation of the specified ligand. Compounds include ligand/heme/transition metal complexes, and ligand ferrous protoporphyrin complexes, including for example, carbon monoxide/heme/transition metal complexes, and carbon monoxide ferrous protoporphyrin complexes. Carbon monoxide donating compounds, sulfur monoxide donating compounds, nitrous oxide donating compounds and hydrogen sulfide donating compounds include polymeric materials with the appropriate donating functional group chemically bound to the polymer chain.

The myoglobin blooming agent is preferably present in a desired concentration in contact with a meat product. The packaging insert preferably contains a blooming agent in a concentration high enough to produce or preserve a desirable appearance in a meat product. It will be appreciated by those skilled in the art that a myoglobin blooming agent may be present on or within the packaging insert and on or within a packaging web used to form a package for fresh meat. Preferably, the blooming agent is present in a concentration sufficient to convert at least 50% of the myoglobin molecules on a contacting meat surface to a desired ligand binding state. The concentration of blooming agent is preferably selected to bind ligands producing desirable appearance or color of the meat to the myoglobin molecules in the outermost ¼-inch or less of the meat product. For example, a nitric oxide donating myoglobin blooming agent is desirably present in a concentration sufficient to convert at least 50% of the myoglobin molecules on the contacting meat surface to nitric oxide myoglobin.

When the blooming agent is niacin, the concentration of niacin chosen is greater than the concentration of niacin naturally found in meat. According to Richardson et al., (1980, Composition of foods. Sausage and luncheon meats (Raw, Processed, Prepared) Handbook No. 8-7, USDA, Science and Education Administration, Washington, D.C.), niacin naturally occurs in poultry and red meat at about 0.05-0.09 mg/g. In the present invention, when niacin is employed as the blooming agent and incorporated in the meat product, it is typically used in amounts greater than 0.1 mg/g of meat.

The myoglobin blooming agent may be coated on the exterior surface of the packaging insert by spraying or dusting or other application means or the blooming agent may be incorporated within one or more layers used to form the insert.

Other additives known to one skilled in the art can be added in addition to the blooming agent. These additives can be added directly to the food product or to the packaging insert, either incorporated within or coated or dusted on the surface. Examples of other additives include monosodium glutamate, salt, cereal, soybean flour, soy protein concentrate, lactose, corn syrup solids, antimycotics (which suppress the growth of yeasts and molds), antibiotics, sugar, glycerol, lactic acid, ascorbic acid, erythorbic acid, α-tocopherol, phosphates, rosemary extract and sodium benzoate.

Myoglobin blooming agents and solutions or dispersions thereof may be colorless, or, such as sodium nitrate, may have an intrinsic pale yellow color (i.e., may not be totally colorless), but this color does not typically have sufficient intensity itself to act as a significant colorant or color additive. However, this does not preclude either the use of colored myoglobin blooming agents which impart an intrinsic color or the combination of a myoglobin blooming agent in combination with one or more natural and/or artificial colorants, pigments, dyes and/or flavorants such as annatto, bixin, norbixin, beet powder, caramel, carmine, cochineal, turmeric, paprika, liquid smoke, erythrosine, betanine, one or more FD&C colorants, etc.

The myoglobin blooming agent is believed to cause an interaction with myoglobin in meat products, thereby maintaining, promoting or enhancing a desirable meat color. Myoglobin includes a non-protein portion called heme and a protein portion called globin. The heme portion includes an iron atom in a planar ring. The globin portion can provide a three-dimensional structure that surrounds the heme group and stabilizes the molecule. The heme group provides an open binding site that can bind certain ligands having the proper shape and electron configuration to the iron atom. When a ligand enters and binds to the heme pocket, the electron configuration of the ligand affects light absorption characteristics of the heme group. Therefore, the presence or absence of a ligand such as oxygen in the heme pocket, and the ligand itself can result in visible color changes of myoglobin.

When there is no ligand in the heme pocket, myoglobin is called deoxymyoglobin, which has a purple color (which is sometimes characterized as purple, deep red, dark red, reddish blue or bluish red). Molecular oxygen, $O_2$ ("oxygen") readily acts as a ligand that binds to the heme group, permitting biological transport of oxygen from the blood stream to the mitochondria within cells. When oxygen binds to the heme pocket, purple deoxymyoglobin becomes oxymyoglobin, characterized by a red color. Upon dissociation of the oxygen ligand from oxymyoglobin, the iron atom is oxidized leaving the iron in the ferric state. The oxidation of the iron atom renders the molecule incapable of normal oxygen binding. As the chemical state of iron can change from ferrous ($Fe^{2+}$) to ferric ($Fe^{3+}$), the three-dimensional structure of the globin part can change in a manner that allows water molecules to bind to the heme pocket. Binding of a water molecule in the ferric iron containing heme pocket affects light absorption of the heme pocket. The oxidized form of myoglobin with a water molecule in the heme group is referred to as metmyoglobin and its color is brown. The oxidation of the iron atom is believed to result in a brown color. Heme ligands other than oxygen or water may also affect meat color. For example, the presence of carbon monoxide (CO) may cause fresh meat to have a desirable bright red color similar to oxygen. Although it has been suggested that nitric oxide (NO) can cause a dull red color (or stable pink color in the case of cured meat which also contains sodium chloride), it has been discovered that in the absence of oxygen, NO may produce a desired bright red color similar to that caused by oxygen in uncooked meat, especially in fresh, raw, unprocessed or uncured meat. It has been discovered that the development of this desired bright red color may take many hours and typically may take from 1 to 5 days and that initially, the meat color in a vacuum package having an oxygen barrier may turn to an undesirable brown until the unexpected transformation to the desired red takes place.

Other variables that affect the stability of the globin portion also affect the affinity of the heme group for oxygen and the tendency of the chemical state of the iron atom to become oxidized. Acidity and high temperature, such as that associated with cooking, can denature the globin part thus leading to instability of the heme group. In the absence of stabilizing ligands, the oxidation of the heme iron is automatic when the globin is denatured.

Packaging Inserts

A packaging insert is an article that is incorporated in a packaged food product which is not an integral part of the packaging film that forms the outer wrapper. A packaging insert, when incorporated in a packaged food, is in contact with the food product. Packaging inserts can serve any of a variety of purposes including absorbing liquids, cushioning sharp or rough surfaces such as bones, protecting a surface on the food product, modifying the atmosphere within the package, or containing all or a portion of the food product such as the giblets inside of poultry. Examples of packaging inserts include absorbent and non-absorbent pads, soaker pads, purge control pads, puncture resistant inserts, packets, pouches, sachets and trays.

Figure 2:
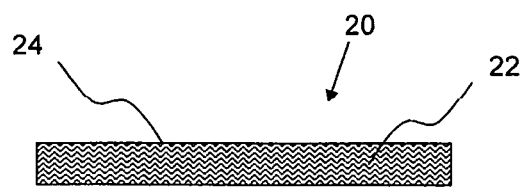
FIG. 2 shows a side view of a second exemplary packaging insert having a first layer comprising a myoglobin blooming agent.
Figure 3A:
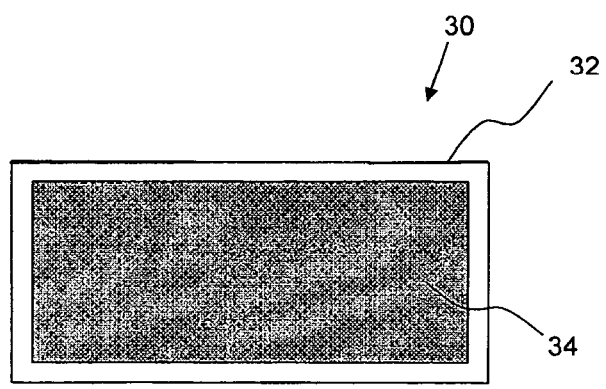
FIG. 3a shows a third exemplary packaging insert of the present invention comprising first and second layers, wherein the second layer comprises an absorbent material.
Figure 3B:
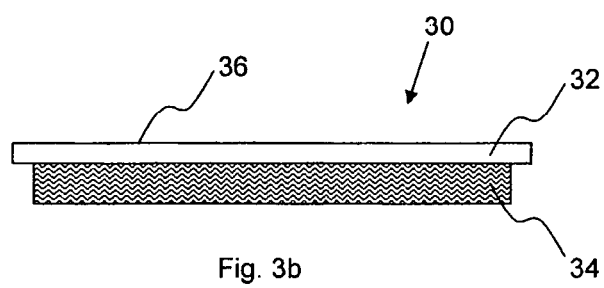

Referring to FIG. 2, in one embodiment, the packaging insert 20 shown in a side-on view, has a layer 22 comprising a myoglobin blooming agent and a meat contact surface 24. Referring to FIGS. 3a and 3b, in another embodiment, the packaging insert 30 comprises a layer 34 comprising an absorbent material, adjacent to a layer 32 comprising a myoglobin blooming agent and having a meat contact surface 36. The layer 32 may be perforated or otherwise fluid pervious. In other aspects, the layer 32 may be fluid impervious. In some aspects, the layer 32 is coextensive with the layer comprising an absorbent material. In other aspects, the layer 32 extends beyond the perimeter of the layer comprising an absorbent material as illustrated in FIGS. 3a and 3b.

Figure 1B:
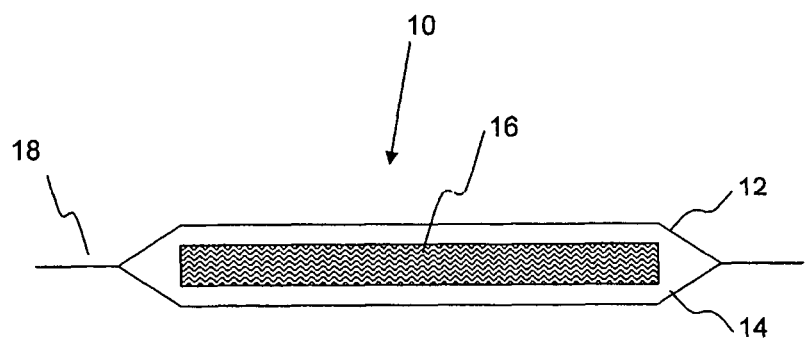

Referring to FIGS. 1a and 1b, in yet another embodiment of the present invention, the packaging insert is represented generally by reference number 10 having a layer 12 comprising a myoglobin blooming agent and a layer 14 with a layer 16 comprising a myoglobin blooming agent positioned therebetween layer 14 and 12. Layer 12 and layer 14 are the outer layers of insert 10 and can be film, non-woven, or paper. Layer 12 and 14 are bonded together at least partially around a periphery 18 of the packaging insert. Either or both of layers 12 and 14 may be fluid permeable and may include holes, microperforation, or slits. Either layer may be liquid impermeable. Examples of appropriate layers include, but are not limited to, polyethylene, polypropylene, polyester, or any combinations thereof.

In one aspect of the first embodiment, the packaging insert comprises a first layer comprising a myoglobin blooming agent. The first layer may be a film, a web, a non-woven, a paper, or other suitable material. In some aspects, the first layer comprises a polymeric material. Examples of polymeric materials include polymers and polymeric blends of the following monomers: mono-olefins and conjugated di-olefins, e.g., ethylene, propylene, 1-butene, isobutene, 1,3-butadiene, isoprene and other aliphatic mono and di-olefins; halogen substituted olefins, e.g., vinyl chloride, vinylidene chloride; mono/vinylidene aromatic compounds, e.g., styrene, alpha methylstyrene, chlorostyrene, other aromatic olefins; and other unsaturated monomers such as acryonitrile, acrylamide and the like. Polyamide polymers, e.g., nylon 66 and nylon 6, polyesters, urethanes, copolyether esters, and copolyether amides may also be used. Preferably the film comprises polyethylene, polypropylene or polyester. In some embodiments, it may be desirable to use polymers that offer high elasticity with increased ability to expand. This property may be desirable to accommodate the swelling of the absorbent layer after absorbing liquids. Polyurethane, metallocene polyethylenes, and block copolymers (synthetic rubber), which can be cast or blown into a film or extruded into a non-woven (spunbond, meltblown, or any combinations thereof) either individually, as a co-extrusion or a bicomponent formation, or in a blend, may be employed when high elasticity is desired. The film may be monolayer or multilayer. Multilayer films may comprise between 2 and 14 layers. The film can be any suitable color, with white or black preferred.

The first layer comprises a myoglobin blooming agent. The myoglobin blooming agent may be coated on the meat contact surface of the first layer by any suitable method including spraying, dusting or dipping. The myoglobin blooming agent is preferably evenly dispersed over the meat contact surface of the first layer.

In other embodiments, the myoglobin blooming agent may be incorporated within the first layer by any suitable method. When the first layer is a film or web, the myoglobin blooming agent may be mixed with a base polymer prior to extrusion of the film or web. For example, the base polymer can be a polyolefin, such as polypropylene, polybutylene, polyethylene, and may be very low density polyethylene (VLDPE), ultra low density polyethylene (ULDPE) linear low density polyethylene (LLDPE), low density polyethylene (LDPE).

Melt blending is a preferred method of mixing the base polymer and the myoglobin blooming agent. The individual component materials may be combined in a high intensity mixing device such as an extruder. The base polymer is melted to form a viscous liquid or "melt." The myoglobin blooming agent may be combined with the polymer before, during, or after melting. The high intensity mixing device is used to attempt to uniformly disperse the myoglobin blooming agent within the base polymer. The quality and functionality of the dispersed additive can depend upon the myoglobin blooming agent and the base polymer as well as the mixing device. It is desirable to achieve good mixing for uniform dispersion of the myoglobin blooming agent within the melt; the presence of poorly wetted particle agglomerations is undesirable.

Depending on the myoglobin blooming agent, the myoglobin blooming agent may be either directly added to the base polymer melt or provided in an aqueous solution that is added to the polymer melt. For a water soluble material, it has been found that providing the myoglobin blooming agent as an aqueous solution provides better distribution of the compound within the polymer. An aqueous solution is prepared from the myoglobin blooming agent. The concentration of the myoglobin blooming agent is preferably close to the saturation concentration of the aqueous solution. The solution preferably includes between about 20 wt % and about 42 wt % of the myoglobin blooming agent. The aqueous solution including the myoglobin blooming agent and water is introduced into a polymer melt. This is typically performed in an extruder. The base polymer is preferably at a temperature above a melting point of the base polymer so as to form a polymer melt. The polymer is typically heated to a temperature above about 300° F. The solution is mixed with the polymer melt in the extruder to form a blend. At least a portion of the water vaporizes and vents from the extruder. The blend is extruded from the extruder. The blend is typically extruded into pellets, but may be extruded directly as a film or web.

The myoglobin blooming agent may be added to the same extruder used to form the film or web. More commonly, the compound is first mixed with the base polymer to form a masterbatch. Pellets from the masterbatch are convenient for subsequent use in fabricating articles. Thus, after dispersion of the myoglobin blooming agent in the mixing device is complete, the melt is discharged through a shaping device or die that is used to prepare pellets of the masterbatch. To form the convenient pellet shape, the die typically is outfitted with circular orifices through which the molten compound flows. The circular orifices form continuous cylinders of the compound that are subsequently cut to form pellets. Pellets from the masterbatch may then mixed with the base polymer or another polymer during the film forming process.

Heat resistant layers generally comprise the outer or inner layer of a multilayer plastic film formed from a coextrusion process. Reference to the outer layer of a multilayer film is intended to refer to the outer circumferential layer of a tube of plastic film formed via an extrusion process. Bags can be formed by heat sealing a tube of plastic multilayer film. An absorbent pad may be placed in such bags to form a soaker pad with a plastic film covering. Heat resistant layers are useful to prevent simultaneous heat sealing between overlapping bags during heat sealing processes.

The multilayer films can comprise an adhesion or tie layer, which can be selected to promote the adherence of adjacent layers to one another in a multilayer film. The adhesion layer is preferably formulated to aid in the adherence of one layer to another layer without the need of using adhesives by virtue of the compatibility of the materials in that layer to the adjacent layers. In some embodiments, adhesion layers comprise materials found in both the adjacent layers.

The multilayer films can comprise a sealant layer. A sealant layer is preferably formulated and positioned to form a heat seal. The sealant layer may comprise either the inner layer or the outer layer of a multilayer plastic film formed from a coextrusion process and allows a multilayer film to be formed into bags. An absorbent pad may be placed in such bags to form a soaker pad with a film covering.

In one aspect of the present invention, a layer may comprise an absorbent material. Packaging inserts comprising a layer comprising an absorbent material are fluid absorbing packaging inserts which are often referred to in the art as "soaker pads," or "purge control pads." Soaker pads are well known in the art and may be made from a variety of materials. Soaker pads may be manufactured in a wide variety of sizes and shapes (e.g., rectangular, oblong, trapezoidal, triangular, circular, oval, donut-shaped, cone, rod, hourglass, "T"-shaped, asymmetric, etc.), and can be adapted to any type and shape of food product being packaged, although rectangular configurations are most common.

The layer comprising an absorbent material may or may not include a myoglobin blooming agent. The absorbent material can be any material capable of absorbing liquids, in particular food product fluids, and is preferably approved or approvable for use with food products, in particular meat products. Absorbent materials can be made from manufactured or synthetic fibers, or natural fibers, or a combination thereof, and either woven or non-woven. Non-woven refers to a web that has a structure of individual fibers or threads which are interlaid, but not in any regular, repeating pattern. The individual fibers may be secured or attached to each other. Many types of non-woven fabrics are known in the art. One such suitable fabric is a 40 g per square meter bi-component continuous filament which is pressure and temperature bonded. The filament can be made of a polyester core with a polyethylene sheath and this type of material is known. The filament may comprise a different type of sheath plastic such as polypropylene or a polypropylene polyethylene co-polymer. These filaments are desirable because a strong heat seal can be formed in the non-woven fabric. These non-woven fabrics have a good random distribution of the fibers to ensure suitable pore size or holes in the fabric to prevent superabsorbent polymer granules from squeezing through the fabric.

The absorbent material may be tissue including tissue wraps and tissue laminates, absorbent sponge materials including cellulose sponge, absorbent foams including open cell and closed cell foams, polymeric material including superabsorbent polymers, and other absorbents.

The layer of the soaker pad comprising an absorbent material may comprise a single type of absorbent material or mixture. Although many types of absorbents are known and used in soaker pads, superabsorbent polymers, which can absorb many times their weight in liquid, are preferred. Superabsorbents can be made from chemically modified starch and cellulose, poly(vinyl alcohol), poly(ethylene) oxide, and cross-linked poly(acrylic acid). Examples include, but are not limited to, sodium salts of cross-linked poly(acrylic acid)/polyalcohol and sodium carboxy methyl cellulose cross-linked with a suitable aluminum compound. These polymers are hydrophilic and have a high affinity for water. The polymers are typically dried and milled into granular solids which swell to a gel upon absorbing water.

Other superabsorbent materials include superabsorbent composites of superabsorbent polymer granules adhered with one or more binders and/or plasticizers, airlaids with superabsorbent, fibrous or foam structures that have been coated or impregnated with a superabsorbent, nonwoven fabric structures such as thermal bond or resin bond that contain superabsorbent particles or fibers, absorbent structures containing superabsorbent material formed and/or crosslinked in-situ, absorbent gelling materials including gelatinized starches, gelatin, dextrose, or any combinations thereof.

Other absorbent material in include cellulosic materials. Examples of cellulosic materials include wood pulp (known in the art as wood fluff), rayon, needle punctured rayon, lyocell (TENCEL®), cotton, rag paper; pulp paper blotter, creped cellulose wadding, chemically stiffened, modified or cross-linked cellulosic fibers including, for example, carboxymethylcellulose (CMC) and salts thereof, hydroxyethylcellulose, methylcellulose, and hydroxypropylmethylcellulose.

Absorbent materials also include high yield pulp fibers, flax, milkweed, abaca, hemp, cotton or any of the like that are naturally wet resilient or any wood pulp fibers that are chemically or physically modified, e.g., cross-linked or curled, that have the capability to recover after deformation in the wet state, as opposed to non-resilient fibers which remain deformed and do not recover after deformation in the wet state. Wet-resistant bonds are fiber-to-fiber bond sites that are resistant to disruption in the wet state resulting in improved wet tensile strength. As used herein, "high yield pulp fibers" are those paper making fibers produced by pulping processes providing a yield of about 65 percent or greater, more specifically about 75 percent or greater, and still more specifically from about 75 to about 95 percent. Such pulping processes include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulphite pulps, and high yield kraft pulps, all of which leave the resulting fibers with high levels of lignin. The preferred high yield pulp fibers are characterized by being comprised of comparatively whole, relatively undamaged tracheids, high freeness (over 250 CSF), and low fines content (less than 25 percent by the Britt jar test).

The absorbent material may also comprise synthetic polymers, fibers, or materials which may or may not be used in combination with cellulose or cellulose derivatives. One example of such material is a pulp coform material, an example of which is described in U.S. Pat. No. 4,929,480. In this example, the pulp coform material comprises wood pulp fluff and extruded thermoplastic synthetic fibers. The synthetic fibers are typically meltblown thermoplastic materials such as polypropylene or polyethylene fibers.

The absorbent material may comprise an additive. Additives include binder fibers, bactericidal agents, and additives to improve absorbency. Additives which improve absorbance include clays (such as attapulgite, montmorillonite (including bentonite clays), hectorite, sericite, kaolin), mineral compositions such as diatomaceous earth, inorganic salts, polymeric flocculating agents, CMC, starch, dextrose, gelatin, natural gums (such as xanthan, guars, and alginates), inorganic buffers, superabsorbent polymers in the form of in the form of a fiber, powder, flake, particle, or granule, or other form including carboxy-methyl-cellulose superabsorbent compounds and acrylic superabsorbent (acrylic acid and sodium acrylate copolymer) compounds. Carboxymethylcellulose is a preferred additive.

Other additives include binder fibers which facilitate binding of the absorbent layer to the top or bottom sheet. Binder fibers include coextruded materials such as polypropylene/polyethylene, polyester/polyethylene, and polyester/polypropylene fibers.

The absorbent material may also contain bactericidal agents. Examples of bactericidal agents include broad spectrum antibiotics such as tetracyclines, e.g., chlorotetracycline and oxytetracycline; penicillin; sorbic acid; alkyl substituted or alkyl aryl substituted quaternary ammonium compounds such as trimethyidodecylammonium chloride, cetyltrimethylammonium bromide and alkyldimethylbenzylammonium chloride; chlorine containing compounds such as the hypochlorites and chloroamines; iodine compounds such as sodium hypoiodite; phenol and its derivatives such as pentachlorophenol and orthophenylphenol; dehydroactic acid; peroxygen compounds such as hydrogen peroxide, potassium persulfate, peracetic acid and sodium perborate.

The additive may be applied to the absorbent material in any preferred manner. Two basic methods are firstly wetting the absorbent material with an aqueous solution of the additive and then drying, or, secondly, mixing or impregnating the absorbent material with a dry agent. Of course, any method of placing the additive within the absorbent material that will not adversely affect product quality is acceptable.

When the packaging insert comprises more than one layer, the layers are desirably compressed together to minimize the bulk or thickness of the absorbent insert. Passing multiple layers simultaneously through one or more rollers or nips mechanically compresses the layers in their entirety, and the equipment used to do this is often termed a calendar or supercalender. In addition to calendaring or supercalendering, the layers may be compressed using flat platen presses or fabric nips.

When the packaging insert comprises more than one layer, the layers may be adhered by any suitable manner known to one skilled in the art, including, for example, mechanical crimping, adhesively bonding, sewing, pressure bonds, ultrasonic bonding, or heat sealing. The layers may be adhered throughout, at specific points or along the periphery of the layers.

In one embodiment, when the layer comprising an absorbent material is at least partially disposed between two other layers, the two other layers may be attached partially along peripheral edges, or portions of the peripheral edges. For example, when the sheets are rectangular, it may be desirable to attach the sheets along two, three or all four edges. The sheets may be adhered together by pressure, adhesive, ultrasonic bonding, mechanical crimping, sewing and the like. These methods provide a solid bond capable of resisting bursting. Spraying or otherwise applying glue or other adhesive on surfaces adjacent the edges of the sheet, thermal sealing, such as a hot melt adhesive, or by the application of heat and pressure may also be used. A wax or other food grade sealant may be applied, or the film layers may be hermetically sealed. An embossing, knurling, or point-bonding pattern can be used for even stronger and more flexible bonds than simple flat bonding.

Thermal sealing can provide a strong seam with a minimal amount of material from the top and bottom sheets. Using adhesives to bind the top sheet to the bottom sheet typically requires between about 0.25 inches to about 0.5 inches of material from the top and bottom sheets to create a sufficient seal. However, seals formed by this traditional method are prone to failure when the absorbent layer absorbs fluid and exerts stress on the seal. Thermal sealing provide for strong sealing using only about 0.125 inches to about 0.5 inches of material to create the seams.

Heat sealing of film, non-woven, or paper sheets may be desirably enhanced by using a film co-extruded with, a non-woven bi-component with, or a paper coated with a low-melt material. Generally, low-melt materials, such as polymers, are on one side of the sheet and are positioned toward the absorbent layer. The low-melt materials can be on both sheets to be sealed or on only one of the sheets. It is preferred that both sheets to be sealed have low-melt materials. A preferred co-extruded film is of a high-density polyethylene (HDPE) with an ethylene vinyl acetate (EVA) component on the low-melt side. A preferred thickness for these films is between about 0.0075 inches to about 0.003 inches. The layers can be corona treated to promote ink anchorage and seam bonding. Techniques for sealing the layers include conventional heat/pressure, thermal impulse sealing, radiant surface heat followed by pressure or heat/pressure, ultrasonic sealing, or any combinations thereof. An example of a combination of techniques is ultrasonic sealing preceded by thermal or radiant heat application.

Corona treatment involves exposing a gas situated in an air gap between an electrode assembly and a treater roll to a very strong electrical field to break down and ionize the gas, which enables the gas molecules to become conductive. When a sufficient number of gas molecules have become ionized, a conductive path is generated between the electrodes causing a sudden discharge across the path resulting in a bright flash or arc, which is interrupted by a solid dielectric barrier of sufficient material. This causes, instead of a hot localized arc, a cooler diffuse glow. The soft colored discharge is called a corona and indicates the incomplete breakdown of the gas. Substances to be treated, such as the surfaces of film, non-woven, and paper sheets in the absorbent packaging insert of the present invention, are passed into the corona field where it is exposed to the high voltage discharge and the bombardment of high energy particles. The corona field has the ability to break polymer bonds, cause micro-pitting, and deposit an induced surface charge with extremely high levels of strong oxidizing agents onto the substance. Corona treatment can alter the surface characteristics of the substance allowing for enhanced surface adhesion and acceptance of printing inks, adhesives, coatings, and the like.

In one aspect of the present invention, a layer may be fluid pervious. For example, when the packaging insert comprises a layer comprising an absorbent material, it may be desirable for the layer to be fluid pervious such that fluid can reach the layer comprising the absorbent material, particularly when it is encapsulated by two other layers. A liquid permeable layer may be rendered permeable due to the nature of the material or the process by which it is made. For example, permeable layers can be prepared from paper and non-woven fibers. Other layers may be made permeable by post-processing methods to provide holes, slits, perforations, microperforations (for example less than about 0.01 inches), and the like, in the sheet. U.S. Pat. No. 6,270,873 describes an absorbent packaging insert with microperforations.

In other aspects of the present invention, it may be desirable to use a liquid permeable layer, a liquid impermeable layer, a layer comprising an absorbent material or a combination thereof. For example, an absorbent packaging insert may comprise a layer having a meat contact surface, wherein the layer is substantially liquid impermeable, serving as a hydrophobic barrier to the food product with respect to reverse migration of liquids from the layer comprising the absorbent material to the meat product. In other aspects, a layer having a meat contact surface may be fluid permeable to allow fluids on the meat contact surface to reach the absorbent layer. The liquid permeable layer may contain holes, slits, perforations, microperforations (for example smaller than about 0.01 inches), and the like, thereby allowing fluid from the meat product to penetrate through the permeable layer to the adjacent absorbent layer.

In other aspects of the present invention, a layer comprising a water-soluble resin is provided. Suitable water-soluble resins which may be used in the invention are described in Davidson and Sittig, *Water-Soluble Resins*, Van Nostrand Reinhold Company, New York (1968), herein incorporated by reference. The water-soluble resin should have proper characteristics such as strength and pliability in order to permit machine handling. Preferred water-soluble resins include polyvinyl alcohol, cellulose ethers, polyethylene oxide, starch, polyvinylpyrrolidone, polyacrylamide, polyvinyl methyl ether-maleic anhydride, polymaleic anhydride, styrene maleic anhydride, hydroxyethylcellulose, methylcellulose, polyethylene glycols, carboxymethylcelulose, polyacrylic acid salts, alginates, acrylamide copolymers, guar gum, casein, ethylene-maleic anhydride resin series, polyethyleneimine, ethyl hydroxyethylcellulose, ethyl methylcellulose, hydroxyethyl methylcellulose. Lower molecular weight water-soluble, polyvinyl alcohol film-forming resins are generally, preferred.

The generally preferred water-soluble, polyvinyl alcohol film-forming resins should, in addition to low weight average molecular weights, have low levels of hydrolysis in water. Polyvinyl alcohols preferred for use herein have a weight average molecular weight between about 1,000 and about 300,000, and preferably, between about 2,000 and about 150,000, and most preferably, between about 3,000 and about 100,000, including all ranges subsumed therein.

Even further, it is within the scope of this invention to include polyvinyl alcohol films which are copolymers, such as films prepared from vinyl acetate and methacrylic acid precursor monomers. Preferred copolymers typically comprise less than about 15.0% by weight methacrylic acid units in their backbone.

Various changes and modifications may be made without departing from the scope of the invention defined herein. For example, it is also contemplated that packaging inserts are provided in the form of sachets or "tea bags" which may or may not include a myoglobin blooming agent gas-releasing powder contained therein. The sachets may include liquid absorbent or non-absorbent monolayer or multilayer webs as described herein. Preferably, the sachet is placed adjacent to the packaged product. When water or other fluids permeate into the sachet, a gas may be generated and released into the atmosphere surrounding the product. The gas released alters the atmospheric conditions within the package. Preferably, the gas comprises a gaseous myoglobin blooming agent, more preferably, carbon monoxide, carbon dioxide, sulfur monoxide, nitrous oxide, nitric oxide or combinations thereof, and most preferably, nitric oxide.

The above examples are illustrative only, and should not be interpreted as limiting since further modifications of the disclosed embodiments will be apparent to those skilled in the art in view of this teaching. All such modifications are deemed to be within the scope of the embodiments disclosed herein.

Puncture Resistant Packaging Inserts

A puncture resistant packaging insert is a non-shrinkable article used to prevent the puncture of a packaging film or other packaging means by sharp portions or rough surfaces of the food product, such as bone parts or other protruding parts of the meat product. In addition, the puncture resistant insert can also prevent puncture from exterior forces applied against such sharp parts of the meat product. Puncture resistant inserts are resilient and may be conformable to the sharp portion of the meat product which they protect. Examples of puncture resistant inserts include cushion pads including foams, wax impregnated fabrics or webs, puncture resistant webs, and plastic bone caps.

Figure 4:
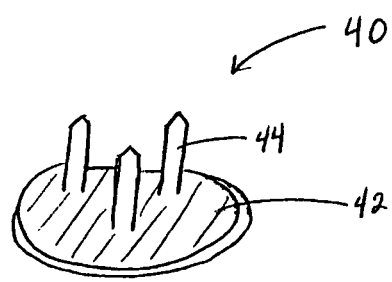
FIG. 4 shows a puncture resistant packaging insert of the present invention.
Figure 8:
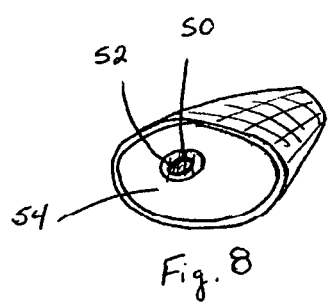
FIG. 8 illustrates a puncture resistant packaging insert protecting the bone of a meat such as a ham.

Referring to FIG. 4, a puncture resistant packaging insert 40 has a food contact surface 42 which covers the sharp or rough portion of the meat product and also contacts the myoglobin containing meat. The food contact surface 42 of the puncture resistant packaging insert comprises a myoglobin blooming agent. The puncture resistant packaging insert may optionally have prongs 44 that help to maintain the location of the insert over the sharp or rough portion of the meat. FIG. 8 illustrates a puncture resistant packaging insert 50 covering the bone 52 of a meat such as a ham bone.

Referring to FIG. 9, a puncture resistant packaging insert 92 is incorporated in a bag 94 for packaging meat products. Puncture resistant packaging insert 92 is formed of a puncture resistant polymer such as nylon, and is illustrated as a rectangular patch, but any suitable shape or geometry may be chosen for the puncture resistant packaging insert. FIG. 10 illustrates a cross-sectional view of bag 94 along line 91-91. The bag comprises a front wall 102 and back wall 104. The puncture resistant packaging insert 92 has a food contact surface 106 comprising a myoglobin blooming agent.

Puncture resistant packaging inserts may be made from a variety of materials including paper, paper laminates, cloth or fabrics including cheesecloth, webs, polymers and plastics. Examples of puncture resistant polymers include nylons, polyesters, polyolefins, such as, polypropylene and polyethylenes, including ultra low density polyethylene and linear low density polyethylene. Puncture resistant packaging inserts may also be formed of resilient plastic foam materials including foams formed from polyethylene, polypropylene, ethyl cellulose, cellulose, urethane and vinyl. Preferably when used with vacuum packaging processes, foams have closed cell structures. Other puncture resistant packaging inserts include wax impregnated cloths or paper. Suitable waxes include low melting food grade petroleum wax and paraffin. Alternatively, the puncture resistant packaging insert may be a hard plastic disk or cap that covers the bone or other sharp or rough portion of the food product.

The puncture resistant packaging insert has a food contact surface which may comprise a myoglobin blooming agent. The myoglobin blooming agent may be coated on the meat contact surface of the puncture resistant packaging insert or it may incorporated within the puncture resistant packaging insert such that the myoglobin blooming agent is evenly dispersed throughout the meat contact surface. When the myoglobin blooming agent is coated on the meat contact surface, it may be done so by any suitable means including spraying, dusting or dipping.

When the myoglobin blooming agent is incorporated into the puncture resistant packaging insert, it may done so by an suitable means, for example by incorporation in the cloth, foam, wax, and the like. Depending on the myoglobin blooming agent, the myoglobin blooming agent may be either added during the manufacture of the puncture resistant insert, for example, blended or incorporated into the polymer, fabric, or wax materials before the puncture resistant insert is formed. Alternatively, the myoglobin blooming agent may be incorporated into the puncture resistant packaging insert after the insert has been formed. For example, a solution of the myoglobin blooming agent can be formed in a suitable solvent. Depending on the myoglobin blooming agent and insert composition, an aqueous solution may be suitable. The insert is dipped in the solution such that the solution penetrates the insert, in particular, the food contact surface of the puncture resistance insert. The insert is then dried, thereby incorporating the myoglobin blooming agent in the puncture resistant insert. This method is useful for puncture resistant packaging inserts made from porous materials or other material that can likewise absorb liquids including foams, fabrics, papers and webs.

Food Packages

In a second embodiment, food packages are provided that comprise a packaging insert and a fresh meat product.

"Meat" or "meat product" refers to any myoglobin or hemoglobin containing tissue from livestock such as beef, pork, veal, lamb, mutton, chicken or turkey; game such as venison, quail, and duck; and fish, fishery or seafood products. The meat can be in a variety of forms including primal cuts, subprimal cuts, and retail cuts as well as ground, comminuted or mixed. The meat or meat product is preferably fresh, raw, uncooked meat, but may also be frozen, hard chilled or thawed. It is further believed that meat may be subjected to other irradiative, biological, chemical or physical treatments. The suitability of any particular such treatment may be determined without undue experimentation in view of the present disclosure. As long as the myoglobin blooming agent is effective to promote, develop, enhance or maintain a desirable color, it may be advantageously employed to such end. Preferably the meat is less than 20 days post mortem. More preferably, the meat is less than 12 days or even 6 days or less post mortem.

Primal cuts of meat are also termed wholesale cuts and both terms refer to large sections of a carcass that are usually sold and/or shipped to butchers who further subdivide the primal into subprimals and individual retail cuts for sale to consumers. Examples of primal cuts of beef are: round; rump; loin end; flank; short loin; plate; rib; brisket; shank; and chuck. Examples of pork primals include: loin; leg; shoulder; and belly.

Subprimals are intermediate in size and may be divided further into retail cuts or are sometimes sold as retail cuts. Beef subprimals include: arm; blade; ribs; beef plate; top round; bottom round; ribs; top butt; bottom butt; tenderloin; and top loin. Pork subprimals include: butt shoulder; picnic shoulder; center cut; sirloin; butt end; shank end; side pork and side rib.

Retail cuts of meat are consumer cuts made by dividing wholesale cuts into smaller pieces. Examples of retail cuts of beef include: steaks such as round, top round, cubed, sirloin, t-bone, porterhouse, filet mignon, rib eye, rib, skirt, flank, and tip; roasts such as blade, pot, and chuck; corned brisket; fresh brisket; stew beef; short ribs; kabobs; eye of round; rolled rump; shank cross cuts; steak rolls; ground beef; and beef patties. Examples of retail cuts of pork include: arm roasts and steaks; spareribs; bacon; salt pork; ham; ham steaks; ham slices; pork tenderloin; chops; cutlets; fat back; sausage; links; and ground pork.

"Fresh meat" means meat that is uncooked, uncured, unsmoked and unmarinated. "Fresh meat" includes post mortem meat that has been physically divided, for example, by cutting, grinding or mixing. There is no added salt in fresh meat that has not been enhanced. Naturally occurring sodium typically is less than 50 mg/100 g of meat and accounts for a salt content of less than about 0.15 weight %, preferably less than 0.128 weight %. Values of sodium are in a database for nutritional composition of meat called the "National Nutrient Data Bank", and the data is published in Agriculture Handbook No. 8, "Composition of Foods—Raw, Processed, Prepared" referred to in the industry as "Handbook 8," both of which are hereby incorporated by reference.

"Enhanced meat" means meat that has added water mixed with other ingredients such as sodium chloride, phosphates, antioxidants, and flavoring, e.g., to make meat moist, more tender and to help enhance shelf-life. Fresh beef, pork or poultry after being "enhanced" would typically contain 0.3-0.6 weight % salt (sodium chloride).

"Processed meat" means meat that has been changed by heat and chemical processes, e.g., by cooking or curing. Cooked ham, hot dogs, and lunch meat are examples of cured processed meat.

"Uncured processed meats" are processed meats that do not contain nitrites or nitrates. Uncured processed meats would typically contain greater than 1.0% by weight, typically 1.2-2.0 weight %, sodium chloride (salt). Cooked roast beef and bratwurst are examples of uncured processed meat.

"Cured meat" means meat that is preserved through direct addition of nitrite (or nitrate which is converted to nitrite), e.g., having at least 50 ppm sodium nitrite and at least 1% by weight added salt, i.e., sodium chloride, for the purpose of preservation by retarding bacterial growth. Nitrites, nitrates or blends thereof are commonly present with sodium chloride in curing compositions. "Uncured meat" does not contain added nitrite or nitrate. Wet cured meats are soaked in salt brine. Dry cured meats have salt applied to the surface. Injection cured meats have the curing salts (cure) applied by needle injection into the meat.

Cured processed meats often have 2-3.5 weight % salt. A brine content of 3.5-4.0 weight % (2.6-3.0% on a weight basis in treated meat) as the level of sodium chloride salt (potassium chloride may be substituted for some or all of the NaCl) is needed in processed meat to adequately slow down bacterial growth to permit 60-90 day shelf life, although other means of preservation may also be employed to maintain shelf life at reduced salt levels. According to Pegg, R. B. and F. Shahidi, 2000, Nitrite Curing of Meat. Food & Nutrition Press, Inc., Trumbull, Conn., cured meats may have typical salt levels of 1.2-1.8 weight % in bacon, 2-3 weight % in hams, 1-2 weight % in sausages and 2-4 weight % in jerkies. It is believed that fresh meat such as beef, pork and poultry has no nitrite or nitrate naturally occurring or added. The United States Department of Agriculture (USDA) permits ingoing nitrite and nitrate for cured and processed meat at a level up to a maximum of 625 ppm sodium nitrite or 2,187 ppm sodium nitrate in dry cured products. In other applications levels have different limits, e.g., in typical cooked whole muscle meat products the limit as sodium nitrite is 156 ppm and in comminuted meats, 200 ppm. The maximum nitrite usage level in hot dogs or bologna is typically 156 ppm, while that for bacon is 120 ppm. Sodium ascorbate (or similar compounds) may be present in these cures.

In Europe, it is believed that the minimum level of salt and nitrite required by law for curing is 1.0 weight % and 50 ppm respectively. The USDA has stated: "As a matter of policy, the Agency requires a minimum of 120 ppm of ingoing nitrite in all cured "Keep Refrigerated" products, unless the establishment can demonstrate that safety is assured by some other preservation process such as thermal processing, pH or moisture control. This 120 ppm policy for ingoing nitrite is based on safety data reviewed when the bacon standard was developed." (See, "Processing Inspectors' Calculations Handbook", Chapter 3, p. 12, revised 1995). The Handbook also states: "There is no regulatory minimum ingoing nitrite level however 40 ppm nitrite is useful in that it has some preservative effect. This amount has also been show to be sufficient for color-fixing purposes and to achieve the expected cured meat or poultry appearance."

The meat product can be any meat suitable for human consumption that contains a myoglobin like molecule. References to total myoglobin in a meat product refer to the amount of the myoglobin like molecules that are physiologically present in the meat tissue prior to harvesting for human consumption. Specific meat products contain a level of myoglobin sufficient to provide its characteristic color. Examples of suitable fresh meat cuts include beef, veal, pork, poultry, mutton, and lamb. The concentration of myoglobin varies in these different types of meat products. For example, beef typically contains about 3-20 mg of myoglobin per gram of meat, pork contains about 1-5 mg myoglobin per gram of meat, chicken contains less than about 1 mg myoglobin per gram of meat. Thus, the concentration of total myoglobin compounds in the above described meat products is typically between about 0.5 mg and 25 mg of myoglobin compounds per gram of the meat product.

In fresh meat (postmortem muscle tissue), oxygen can continually associate and disassociate from the heme complex of the undenatured myoglobin molecule. It is the relative abundance of three forms of the undenatured muscle pigment that determines the visual color of fresh meat. They include purple deoxymyoglobin (reduced myoglobin), red oxymyoglobin (oxygenated myoglobin); and brown metmyoglobin (oxidized myoglobin). The deoxymyoglobin form typically predominates immediately after the animal is slaughtered. Thus, freshly cut meat can have a purple color. This purple color can persist for a long time if the pigment is not exposed to oxygen. Cutting or grinding exposes the pigment to oxygen in the atmosphere, and the purple color can quickly convert to either bright red (oxymyoglobin) or brown (metmyoglobin). Thus, although deoxymyoglobin is technically indicative of fresher meat, it is the red or "bloomed" meat color that consumers use as their primary criterion for perceiving freshness. It is believed without wishing to be bound by the belief that the preferred red color of fresh meat occurs when at least 50% of the deoxymyoglobin molecules are oxygenated to the oxymyoglobin state. Changes in the relative percentage of each of these forms can continue to occur as fresh meat is exposed to oxygen for longer periods of time. The immediate conversion of the purple color to the desirable bright red or undesirable brown can depend on the partial pressure of oxygen at the surface. The purple color is favored at the very low oxygen level, and can dominate at oxygen levels of 0-0.2% by volume. The brown color is favored when the oxygen level is only slightly higher (0.2% to 5.0%). Consumer discrimination typically begins when the relative amount of metmyoglobin is 20%. A distinctly brown color is evident at 40% metmyoglobin, which typically renders the meat unsaleable even though it remains nutritious and healthy for consumption.

Certain biochemical reactions that occur in muscle tissue after death can also affect fresh meat color, such as the presence of active glycolytic enzymes that convert oxygen to carbon dioxide. Reducing coenzymes called metmyoglobin reductases present in meat convert metmyoglobin back to deoxymyoglobin, and their activity is called "MRA" which is an abbreviation for metmyoglobin reducing activity. MRA can be described as the ability of muscle to reduce metmyoglobin back to its natural deoxymyoglobin state. MRA is lost when the oxidizable substrates are depleted or when heat or acid denatures the enzymes. When the enzymes lose their activity or are denatured, the iron of the heme pigment automatically oxidizes to the metmyoglobin form, and the brown color stabilizes and dominates. MRA persists for a period of time after death depending on the amount of exposure of the meat tissue to oxygen. During this time oxygen is continually consumed by the meat tissue. The oxygen consumption rate is referred to as "OCR". When meat that has a high OCR is exposed to oxygen, the oxygen tension is reduced so rapidly that the metmyoglobin is favored below the viewing surface. If it is close to the viewing surface, the perceived color of the meat is affected. The MRA is important to minimize this layer of metmyoglobin that forms between the bloomed surface and purple interior. As the MRA wears out, the brown metmyoglobin layer thickens and migrates toward the surface, thus terminating display life. When the MRA is high, the metmyoglobin layer is thin and sometimes not visible to the naked eye.

MRA and OCR relate to determining the types of packaging best suited for retail sale in order to prolong the desirable appearance of meat as long as possible. Hermetically sealed packages with films that are a barrier to oxygen will cause a low oxygen tension on the meat surface. Thus, metmyoglobin formation occurs and the viewing surface changes to an undesirable brown color. However, if the OCR is high enough to keep ahead of the oxygen that migrates across the packaging film, and the MRA is good enough to reduce metmyoglobin that forms on the surface, then native deoxymyoglobin replaces metmyoglobin. After a period of time, the perceived color changes from brown to purple. Both of these colors are unacceptable to the consumer. For this reason, vacuum packaging by itself has historically been an unacceptable format for case ready fresh meat although it is used to ship subprimal and other large cuts of meat from the slaughterhouse to retail butchers for further processing and re-packaging. On the other hand, vacuum packaging is the format of choice for cooked and cured processed meats where the myoglobin pigment is denatured by heat. Heat from cooking causes the globin portion of the nitrosylated myoglobin molecule to denature and separate from the heme portion. It is the dissociated nitrosylated heme complex that gives cured and processed meats their characteristic color. When oxygen is eliminated from a cured processed meat package, the product's color and flavor can deteriorate slower than when oxygen is present. In the present invention it is advantageous to reduce or eliminate oxygen from the environment of the raw fresh meat in order to maximize the development of the preferred red color. A certain amount of oxygen may penetrate the meat after slaughter and fabrication. This oxygen is eliminated by the OCR/MRA activities. Similarly, those activities facilitate the dominance of the deoxymyoglobin form of the myoglobin molecule. It is believed, but not wishing to be bound by the belief, that the OCR/MRA activities also facilitate the reduction of nitrite to nitric oxide when sodium nitrite is used as the myoglobin blooming agent. In this case, the formation of deoxymyoglobin and nitric oxide allows for the development of nitroxymyoglobin. Oxygen itself is a myoglobin blooming agent because it causes the formation of oxymyoglobin as described earlier herein. However, oxygen interferes with the reactions that form deoxymyoglobin and nitric oxide. Therefore, it may interfere with the bloomed color development in the presence of nitrite. Thus, it is a preferred aspect of the present invention that an oxygen barrier layer is selected and configured to protect the meat surface from the ingress of atmospheric oxygen during the formation of the desired bloomed meat color.

The absorbent packaging insert of the present invention can be shaped to conform to the desired packaging or container. The particular form of the food container and/or the packaging itself may comprise any one of numerous forms known to those skilled in the art such as, for example, wrapped trays, cardboard boxes, plastic containers, scalable bag, and the like. With respect to packaged meat products, the absorbent packaging inset is often placed over the central portion of a tray. The absorbent packaging insert may be sized to fit the tray as a single continuous unit or configured to overlay the tray in sections. The absorbent packaging insert can be placed over the support tray prior to placing the product thereover, or the absorbent packaging insert may be permanently attached to the tray to prevent movement of the same in handling. For example, the absorbent packaging insert may be adhesively attached to the supporting tray, or may be made an integral part of the tray itself.

Figure 5:
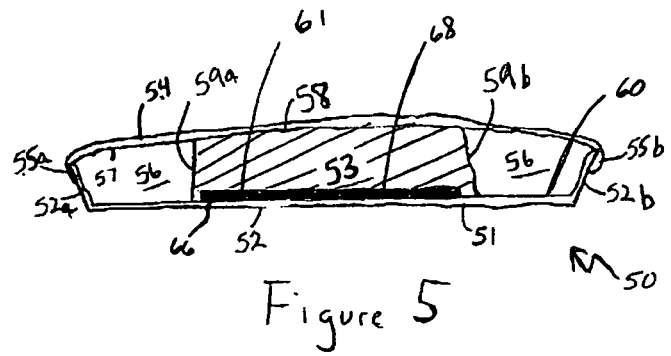
FIG. 5 shows a cross sectional schematic of a meat-containing tray with a barrier film overwrap.

Referring now to FIG. 5, a cross sectional schematic of a meat containing tray 50 is depicted. Tray 51 has a bottom 52 with integral side walls 52a and 52b supporting an absorbent packaging insert 66 beneath a retail cut of meat 53 such as pork. The meat contact surface 68 of the absorbent packaging insert comprises a myoglobin blooming agent which to fix color on the meat bottom surface 61. Film 54 seals the top of the tray 51 and provides a hermetic seal 55a and 55b all along the continuous flanges of the sidewall 52a, 52b. Alternatively, film 54 may drape over walls 52a and 52b and seal to bottom 52 of tray 51 (not shown). The film 54 is either vacuum sealed or sealed in a modified atmosphere with the myoglobin blooming agent containing food contact surface 57 in intimate contact with meat surface 58. Meat side surfaces 59a, 59b are not in contact with the food contact layer 57 but instead are exposed to an atmosphere 56 modified with a gas such as carbon monoxide. The tray has an inside surface 60 on which the absorbent packaging insert 66 rests.

Figure 6:
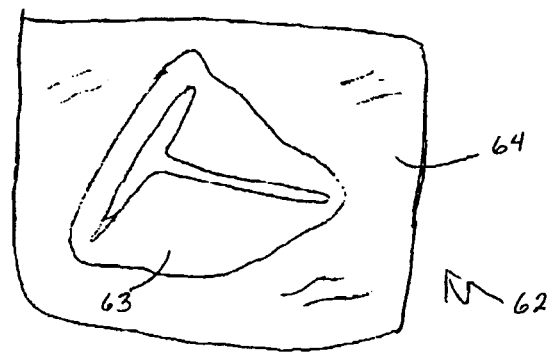
FIG. 6 shows a top view of a vacuum skin packaging film enclosed meat cut.

Referring now to FIG. 6, a top view of a package 62 depicts a myoglobin containing food 63 such as a bone-in cut of meat on a substrate and covered under a vacuum skin packaging film 64 having a myoglobin blooming agent coated food contact surface in contact with the meat. The absorbent packaging insert is below the myoglobin containing food 63. The film is transparent to allow perception of the color and meat surface characteristics.

Figure 7:
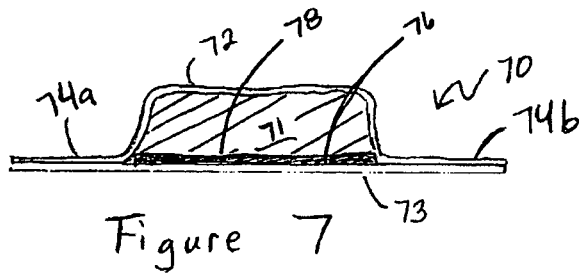
FIG. 7 shows a cross sectional schematic of a meat in a pre-formed container.

Referring now to FIG. 7, a cross sectional schematic of a meat containing formed container 70 is depicted having a myoglobin containing cut of fresh meat 71 disposed in a thermoformed pocket 72 which is heat sealed to a non-oriented film 73 around the meat cut at heat seal 74a which is continuous and joins heat seal 74b to form a hermetic vacuum package having a reduced oxygen atmosphere with intimate contact between the myoglobin blooming agent containing surfaces of film 72 and 73. An absorbent packaging insert 76 is located between the myoglobin containing fresh meat 71 and the non-orientated film 73. The meat contact surface 78 of the absorbent packaging insert 76 is in contact with the myoglobin containing meat.

Packaging Webs

The food packages further comprise an oxygen barrier packaging web comprising a single-layer or multilayer film, sheet or combinations thereof. Single-layer and multilayer packaging webs can have any suitable composition or configuration and may include heat shrinkable and non-heat shrinkable oxygen barrier packaging materials. Preferably, the food packaging web fulfills multiple functional requirements which may be present in one or more or a combination of layers. For example, a single layer web may combine the functions of oxygen barrier and myoglobin blooming agent contact with one or more additional functions such as puncture resistance, abuse resistance, printability, moisture barrier, heat sealability, transparency, high gloss, low toxicity, high temperature resistance, low temperature flexibility, etc. Alternatively, multiple layers may be employed to add functionality. The present invention is adapted for use in a wide variety of commercially available packaging films such as those sold by: Curwood, Inc. under the trademarks ABP, Clear-Tite, Cook-Tite, Perflex, Pro-Guard, Pro-Tite, Curlam®, Curlon® and Surround; and by others, e.g., marketed by Alcan, Asahi, Cryovac, Kureha, Vector, Pactiv, Printpack, Viskase and Wipak, under the trademarks or brand names Cryovac® T-Series, Cryovac® E-Seal Materials, Alcan Q® Series, Alcan Peel Rite™ Peel Systems, Alcan Q⁴ Forming Films, Krehalon®, Alcan Mara Flex® Non-Forming Films, Wipak Combitherm, Wipak Bialon, Wipak Biaxer, and Wipak Biaxop. A typical beneficial food packaging web according to embodiments of the present invention may have an interior surface food contact layer which also serves as a sealant layer, and a heat resistant and abuse resistant exterior surface layer with a core layer there between which comprises an oxygen barrier material. Another common suitable web has adhesive layers on either side of the core oxygen barrier layer to connect with the surface layers.

In the present invention, oxygen barrier, food packaging webs may include food contact surfaces which may or may not comprise a myoglobin blooming agent. A "food contact surface" refers to the portion of a packaging material that is designed to contact a packaged meat product surface. Preferably, when the food packaging web includes a food contact surface comprising a myoglobin blooming agent, the myoglobin blooming agent is present in an amount effective to promote or maintain a desirable color after contact with a meat product. The myoglobin blooming agent (MBA) preferably will contact the meat surface in an amount sufficient to produce a desired red color which preferably does not penetrate to an undesirable depth of the food thickness under reduced oxygen conditions (this color may take awhile to develop, e.g., 1 to 5 days). Beneficially, the MBA may be present on the film food contact surface (or on the myoglobin-containing food product surface) in an amount of from about 0.01 to 3 to 5 to 10 $\mu$moles/in$^2$ and in increments of 0.1 $\mu$mole thereof. Greater or lesser amounts of MBA may be used, and the color intensity may thereby be varied depending upon the relative amount of intrinsinc myoglobin present in the meat.

The packaging webs may or may not be heat shrinkable as that term is generally understood in the industry. That is, if a web is non-shrinkable, it and packages made therefrom may have 10% or less free shrink in both the machine direction and the transverse direction at 90° C. or less as measured before the web has undergone thermoforming. For some applications, the non-shrinkable webs may have less than 5% shrink at 90° C. in both the machine direction (MD) and the transverse direction (TD) as measured before the web has undergone thermoforming. For other applications, the non-shrinkable webs may have a free shrink as measured before the web has undergone thermoforming at 90° C. of less than 2%, more preferably less than 1% in both the machine direction and the transverse direction. In contrast, heat shrinkable webs may have a free shrink at 90° C. of at least 10% in at least one direction. Preferably, heat shrinkable films have a total free shrink at 90° C. of at least about 30%, more preferably at least 40% or 60% or more.

Web Thickness

A packaging web may be a film, a sheet, or combination thereof. Preferably, a flexible film has a total thickness of less than about 10 mil, more preferably the film has a total thickness of from about 0.5 to 10 mil (12.7-254 microns ($\mu$)). Semi-rigid sheets may have a total thickness between about 10 mil to about 20 mil. Rigid sheets may have a total thickness more than about 20 mil. Advantageously, packaging films may have thicknesses from about 1 to 5 mil, with certain typical embodiments being from about 1.5 to 3 mil. For example, entire single or multilayer films or any single layer of a multilayer film can have any suitable thicknesses, including 1, 2, 3, 4, 5, 6, 7, 8, 9, or 10 mils, or any increment of 0.1 or 0.01 mil therebetween. Thicker and thinner films are also provided. Although suitable webs for packaging foodstuffs as thick as 4 mil (101.6 microns) or higher, or as thin as 1 mil (25.4 microns) or less may be made, it is expected that the most common webs will be between about 1.5-3 mil (38-76 microns). Especially preferred for use as webs for food packaging are films where the multilayer films have thicknesses of between about 2 to 3 mil (50.8-76.2 microns). Such films may have good abuse resistance and machinability.

Packaging Methods

In a third embodiment, packaging methods are provided. A number of packaging methods are known in the art, including modified atmosphere packaging, vacuum packaging, skin packaging and vacuum skin packaging.

"Reduced oxygen atmosphere" when referring to a packaged meat product refers to a reduction in the partial pressure of oxygen in contact with the packaged meat product, in comparison with the partial pressure of oxygen in the Earth's atmosphere at standard temperature and pressure at sea level. Reduced oxygen atmosphere packages may include modified atmosphere packages where the oxygen partial pressure is less than that of the Earth's atmosphere at standard temperature and pressure at sea level, or vacuum packages, containing minimal gas pressure in contact with the packaged meat. Modified atmosphere packaging may create a substantially oxygen reduced environment where the oxygen content of less than 3.0% oxygen v/v is desirable, and preferably less than 1.0% oxygen v/v. For processed meat, oxygen content of less than 0.5% v/v is desirable.

"Vacuum packaging" refers to actively eliminating atmospheric gases, most specifically oxygen, from inside the package and sealing the package so that virtually no gas is able to permeate into the package from outside the package. The result is a package with a minimum amount of oxygen gas remaining in contact with the meat inside the package. The removal of oxygen from the immediate environment of the product slows down bacterial and oxidative deterioration processes thereby keeping the quality of the meat fresher for a longer period of time.

"MAP" is an abbreviation for a "modified atmosphere package". This is a packaging format where a gas is actively flushed into the headspace of a package prior to sealing. In general, the gas is modified to be different from that normally found in the earth's atmosphere. The result is a package with a considerable volume of gas surrounding the viewing surface of the product within the package. A fresh meat MAP can use either an enriched-oxygen or an oxygen-free atmosphere to effectively extend shelf life.

"RAP" is an abbreviation for a "reduced atmosphere package." It can be a form of MAP wherein the atmospheric gases are minimal so that the packaging material makes physical contact with the internal contents. RAP can also be a form of vacuum packaging where the atmosphere is not completely evacuated from inside the package. Examples include the conventional fresh meat package such as a "PVC stretch wrapped tray" and the conventional case ready poultry package where a shrink film or bag is hermetically sealed around a tray of meat. In general the fresh meat in a RAP has a higher profile than the tray used to hold the meat so that the packaging film surrounding the product makes considerable physical contact with the meat surface.

"Consumer Package" refers to any container in which a meat product is enclosed for the purpose of display and sale to household consumers.

"Case ready" meat refers to a consumer package of fresh meat that is prepackaged and/or labeled at a centralized location and delivered to the retail market in a format whereby it is ready for immediate display and sale. The case ready package actively extends the quality life of a fresh meat product so as to allow for the extra time that it takes to be packaged at a centrally located facility, distributed to the retail grocer and then displayed under lights for consumer selection and purchase.

As used herein, the phrase "easy open feature" refers to any means for accessing the contents of a container which obviates the need to cut and/or pierce the container with a knife, scissors or any other sharp implement. An easy open feature may be in at least one portion of the web used to form the container and include one or more cuts, notches or surface-roughened areas, lines of structural weakness or combinations thereof. Examples of these types of easy open features are described in co-pending U.S. Patent Application Publication Nos. 2005/0084636 to Papenfuss et al. entitled "Tear Initiation and Directional Tear Films and Packages Made Therefrom" and 2005/0254731 to Berbert et al. entitled "Easy-Open Handle Bag for Medium to Heavy Duty Applications," which are hereby incorporated by reference herein. Alternatively, the easy open feature may include one or more frangible or peelable layers adapted to manually separate or delaminate at least a portion of the web used to form the container and are described in U.S. Reissued Pat. No. RE37, 171 to Busche et al., which is hereby incorporated by reference. It will be appreciated that peelable webs may further comprise one or more reclosable peelable layers, examples of which are described in, but not limited to, co-pending U.S. patent application Ser. Nos. 11/048,425 to Haedt et al. and 11/247,923 to Cruz et al., which are hereby incorporated by reference herein. Examples of still other alternative easy open features include reclosable interlocking fasteners attached to at least a portion of the web used to form the container. Reclosable fasteners, in general, are known and are taught, for example, in U.S. Pat. Nos. 5,063,644; 5,301,394; 5,442,837; 5,964,532; 6,409,384; 6,439,770; 6,524,002; 6,527,444; 6,609,827; 6,616,333; 6,632,021; 6,663,283; 6,666,580; 6,679,027; and U.S. Patent Application Nos. 2002/0097923; and 2002/0196987, each of which is incorporated by reference herein.

EXAMPLES

The following are examples and comparative examples.

Example 1

The following example illustrates the preparation of masterbatch pellets which may be used to form a sheet comprising a myoglobin blooming agent. For maximum benefit, sheets comprising a myoglobin blooming agent are generally intended to contact the meat product surface, although can be used in other capacities if desired.

A solution of the myoglobin blooming agent is prepared by dissolving a suitable amount of the myoglobin blooming agent in water. Suitable concentration of myoglobin blooming agent is approximately 0.60 moles of myoglobin blooming agent in 60 g of water. The solution is made with water at room temperature by gently agitating the water/myoglobin blooming agent mixture.

Dow ATTANE® 4201-G VLDPE (obtained from Dow Chemical Company, Midland, Mich.) is loaded into the hopper of a gravimetric dosing unit that is positioned to feed the polymer into the main feed port of an APV Extrusion Systems MP 2050 50 mm corotating twin screw extruder. The feeder is configured to dose the ATTANE at a rate of 41 kg/h. The mixing elements of the twin screw extruder are arranged in a fashion that allows for feeding and melting of the VLDPE, injection and mixing of the water/myoglobin blooming agent solution, removal of the water, pressurization of a die and formation of continuous strands of a homogeneous VLDPE/sodium nitrite blend.

The twin screw extruder is electrically heated so that the feed zone is at 200° F. and the rest of the extruder at 330° F. When the extruder zones achieve the intended temperatures, the drive motor is engaged to rotate the extruder screws at about 578 RPM. The ATTANE VLDPE is dosed into the primary feed port at 41 kg/h. Once a stable, homogeneous extrudate is achieved, the myoglobin blooming agent/water mixture is injected into the molten VLDPE at injection port. A gear pump operating at 30 RPM is used to deliver the myoglobin blooming agent/water solution to the injection port. The injection point is placed in a section of the extruder configured to have high free volume and low pressure. The rate of delivery of the solution is calculated by the time change in mass of the water/myoglobin blooming agent mixture. The intended concentration of 5% is achieved by adjusting the pump speed. A suitable pump speed is about 33 RPM. The water/myoglobin blooming agent delivery rate is preferably about 5.4 kg/h.

The mixing elements of the extruder are arranged in a fashion such that the liquid water/myoglobin blooming agent solution is prevented from moving upstream to the primary feed port. Full bore orifice plugs are used to prevent the unwanted upstream migration.

Following injection, the myoglobin blooming agent/water solution rapidly increases in temperature. The water fraction of the solution evaporates and eventually boils. The resultant steam escapes through an atmospheric pressure vent port. Some steam may also escape through the primary feed port. Following this mixing section, the VLDPE/salt blend moves into a pressurization section and finally, into an eight hole strand die. Upon exiting the die, the resultant continuous strands are cooled in a water bath. At the exit of the water bath, an air knife removes some of the moisture clinging to the surface of the stands. After leaving the influence of the air knife, the strands are cut into discrete pellets by a rotating knife-style pelletizer. These pellets are subsequently dried in a convection oven at about 50° C., packed in aluminum foil containing bags and stored for use and referred to as masterbatch pellets.

Films for use as the top sheet of a packaging insert are prepared from the masterbatch pellets. The loading level of the masterbatch pellets is varied to produce VLDPE films with an effective myoglobin blooming agent concentration.

Example 2

The following example illustrates the preparation of an absorbent packaging insert from a top sheet, absorbent layer and bottom sheet.

A top sheet film is prepared from polyester, polyethylene or other film comprising a myoglobin blooming agent, such as provided in Example 1, by co-extrusion, lamination, or coating with a low-melt component, such as a polyethylene or a polypropylene blend. A bottom sheet is selected from a high wet strength paper or non-woven fabric. The absorbent layer is calendered between the top and bottom sheet. Heat sealing of the top and bottom sheets is accomplished with heated rotary tooling that has been engraved with a sealing pattern. The gap between the rolls is precisely controlled (to within about 0.0005 inches) and effectively seals the top and bottom sheets at commercial production speeds of between about 50 fpm and about 500 fpm. Pressure is used to keep the two rolls in position. Generally, the hydraulic pressure on each end of the upper rolls is set at between about 100 psi and about 2000 psi. The design of the sealing pattern, width of the process and materials selected dictate the pressure required. It will be appreciated by those skilled in the art that the engraving process may be varied to produce packaging inserts with different sealing patterns. For example, the engraving process may be designed to produce a packaging insert comprising an exterior seal pattern along one or more edges of the insert. Alternatively, two or more interior seals may be formed across one or both faces of the insert thereby creating in a quilt-like pattern on one face of the insert and a goffered structure, respectively. Still other sealing patterns may include both exterior seal patterns along at least one edge of the insert and interior seal patterns across one or more of the faces of the insert.

Example 3

The following example illustrates the preparation of an absorbent packaging with microperforations from a top sheet, absorbent layer and bottom sheet.

The top sheet is a co-extruded single layer film of HDPE with a myoglobin blooming agent and EVA as the low-melt material. The bottom layer is a co-extruded single layer film of HDPE and EVA as the low-melt material. The overall thickness of each sheet is about 1.25 mils (thousands of an inch or about 32 microns). The HDPE component represents about 26 microns while the EVA component represents about 6 microns. Microperforations in the film are made with hot needle perforation pins in a male/female tooling arrangement. The low-melt sides of the top sheet and bottom sheet are brought together around the absorbent layer using a set of pattern rolls that are heated to about 270° F. The absorbent layer is a conventional Airlaid material of cellulose fiber/fluff (about 55%), binder fiber (approximately 15%), and superabsorbent fiber (about 30%).

Example 4

The following example illustrates the preparation of a puncture resistant insert.

Master batch pellets of polyethylene comprising a myoglobin blooming agent are prepared according to example 1. A seven layer co-extruded puncture resistant film is then prepared. The layers of the film are: nylon/tie/nylon/tie/nylon/tie/PE, wherein the PE layer is formed by blending polyethylene and pellets of a masterbatch comprising the myoglobin blooming agent. The PE sealant layer is the food contact layer of the film. The thickness of the film is typically 6-20 mil, and the film is cut into pre-cut sheets, 4"×6", for example to form the puncture resistant packaging insert. The puncture resistant packaging insert is placed inside a bag, either a shrink bag or non-shrink bag. The puncture resistant packaging insert can also be formed around a bone or other sharp or rough portion of the food product. The puncture resistant packing insert can also be formed into a cavity to be placed over a bone or other sharp or rough portion of the food product.

Example 5

The following example illustrates the preparation of a sachet.

Layer 1: PET film adhesively laminated to high opacity filled PE film.
Layer 2: Microporous polypropylene film with Gurley Air permeability of 100 sec/100 cc.
Layer 3: Non woven fabric consisting of a mixture of viscose fibers and polypropylene fibers with a weight of 120 g/m$^2$.

The myoglobin blooming agent is placed between layers 1 and 2. A sachet is formed adhering layers 1 and 2 and layers 2 and 3.

The above examples are illustrative only, and should not be interpreted as limiting since further modifications of the disclosed embodiments will be apparent to those skilled in the art in view of this teaching. All such modifications are deemed to be within the scope of the embodiments disclosed herein.

The invention claimed is:

1. A packaged meat product comprising:
 a package comprising a polymeric web having an oxygen barrier polymeric layer;
 an uncooked meat product; and
 a packaging insert comprising a first layer comprising a myoglobin blooming agent selected from the group consisting of nitric oxide donating compounds and nitrogen heterocycles;
 wherein the packaging insert is sized smaller than the package to which it is to be inserted and at least a portion of the insert is in contact with the meat product.

2. The packaged meat product of claim 1, wherein the myoglobin blooming agent is a nitric oxide donating compound selected from the group consisting of inorganic nitrates and inorganic nitrites.

3. The packaged meat product of claim 1, wherein the myoglobin blooming agent is on at least a portion of a surface of the first layer.

4. The packaged meat product of claim 1, wherein the myoglobin blooming agent is incorporated in the first layer.

5. The packaged meat product of claim 1, wherein the first layer comprises a polymeric material, a non-woven material, a paper material or an absorbent material.

6. The packaged meat product of claim 1, further comprising a second layer.

7. The packaged meat product of claim 6, wherein the second layer comprises an absorbent material and has a meat contact surface.

8. The packaged meat product of claim 7, wherein the absorbent material comprises a superabsorbent polymer.

9. The packaged meat product of claim 7, wherein the absorbent material comprises a polymeric material, a non-woven material, or a paper material.

10. The packaged meat product of claim 9, wherein the first layer comprises a polymeric material, and wherein the myoglobin blooming agent is incorporated in the polymeric film.

11. The packaged meat product of claim 6, wherein the first layer has a meat contact surface.

12. The packaged meat product of claim 11, wherein the second layer comprises an absorbent material.

13. The packaged meat product of claim 12, wherein the absorbent material comprises a superabsorbent polymer.

14. The packaged meat product of claim 12, wherein the first layer comprises a polymeric material, a non-woven material, or a paper material.

15. The packaged meat product of claim 14, wherein the first layer is liquid permeable.

16. The packaged meat product of claim 15, wherein the first layer comprises perforations or microperforations.

17. The packaged meat product of claim 14, wherein the first layer comprises a polymeric material and the myoglobin blooming agent is incorporated in the polymeric material.

18. The packaged meat product of claim 12, further comprising a third layer wherein the second layer is disposed between the first and third layers, the first layer being attached to the third layer at least partially along opposite marginal edge portions.

19. The packaged meat product of claim 18, wherein the third layer comprises a polymeric material, a non-woven material, or a paper material.

20. The packaged meat product of claim 18, wherein at least one of the first layer or third layer is liquid permeable.

21. The packaged meat product of claim 6, wherein the second layer is liquid permeable and has a food contact surface.

22. The packaged meat product of claim 21, wherein the second layer comprises perforations or microperforations.

23. The packaged meat product of claim 21, wherein the first layer comprises an absorbent material.

24. The packaged meat product of claim 23, wherein the absorbent material comprises a superabsorbent polymer.

25. The packaged meat product of claim 6, further comprising a third layer, wherein the first layer is disposed between the second layer and the third layer, the second layer being attached to the third layer at least partially along marginal edge portions; and
wherein the first layer comprises an absorbent material.

26. The packaged meat product of claim 25, wherein at least one of the second layer or third layer is liquid permeable.

27. The packaged meat product of claim 25, wherein at least one of the second layer or third layer comprises a water-soluble resin.

28. The packaged meat product of claim 1, wherein the package further comprises a food contact layer, the food contact layer having a food contact surface, at least a portion of which is in contact with at least a portion of a surface of the uncooked meat product.

29. The packaged meat product of claim 28, wherein the package encloses the uncooked meat product in a reduced oxygen environment.

30. The packaged meat product of claim 28, wherein the uncooked meat product is a fresh meat product maintained in a reduced oxygen environment.

31. The packaged meat product of claim 28, wherein the uncooked meat product is a fresh meat product maintained in a vacuum.

32. The packaged meat product of claim 28, wherein at least a portion of the food contact layer is transparent and in contact with the uncooked meat product.

33. The packaged meat product of claim 28, wherein the package further comprises a tray.

34. The packaged meat product of claim 33, wherein at least a portion of the uncooked meat product is maintained in contact with a modified atmosphere having an elevated level of carbon monoxide, carbon dioxide, nitrogen, an oxide of nitrogen, or mixtures thereof relative to the atmosphere outside the container.

35. The packaged meat product of claim 28, wherein the uncooked meat product is a fresh meat product selected from the group consisting of beef, veal, pork, mutton, lamb, poultry, chicken, turkey, duck, goose, game, fish, and seafood.

36. The packaged meat product of claim 28, wherein the uncooked meat product is a fresh meat product selected from the group consisting of primal, subprimal, retail cut, comminuted, ground and combinations thereof.

37. The packaged meat product of claim 28, wherein the myoglobin-containing food product is fresh, frozen, hard chilled, or thawed.

38. The packaged meat product of claim 1, wherein the web has an oxygen transmission rate of less than about 310 cm$^3$/m$^2$/24 hours measured at 0% relative humidity and 23° C.

39. The packaged meat product of claim 1, wherein the web has an oxygen transmission rate of less than about 20 cm$^3$/m$^2$/24 hours measured at 0% relative humidity and 23° C.

40. The packaged meat product of claim 1, wherein the package comprises a pouch, bag, casing, overwrapped tray, form shrink package, vacuum skin package, flow wrap package, thermoformed package or a combination thereof.

41. The packaged meat product of claim 1, wherein the package is hermetically sealed.

42. The packaged meat product of claim 28, wherein the myoglobin blooming agent is present in an amount sufficient to cause a food surface of the uncooked meat product to have a visible red hue at least 10 days after hermetically sealing the uncooked meat product in a vacuum environment.

43. The packaged meat product of claim 28, wherein the uncooked meat product is packaged less than 20 days post-mortem.

44. The packaged meat product of claim 28, wherein the myoglobin-containing food product is packaged less than 12 days post-mortem.

45. The packaged meat product of claim 28, wherein the myoglobin-containing food product is packaged less than 48 hours post-mortem.

46. The packaged meat product of claim 28, wherein the myoglobin-containing food product has a water content of at least 40 weight %.

47. The packaged meat product of claim 28, wherein the myoglobin-containing food product has a water content of at least 60 weight %.

48. The packaged meat product of claim 28, wherein the myoglobin-containing food product has a sodium chloride content of less than 2.0 weight %.

49. The packaged meat product of claim 28, wherein the myoglobin-containing food product has a sodium chloride content less than or equal to 1.0 weight %.

50. A meat packaging kit comprising:
a packaging article comprising a polymeric web having an oxygen barrier polymeric layer; and
a packaging insert;
wherein the packaging insert comprises a first layer comprising a myoglobin blooming agent selected from the group consisting of nitric oxide donating compounds and nitrogen heterocycles; and
wherein the packaging insert is sized smaller than the packaging article to which it is to be inserted and at least a portion of the insert is in contact with the meat product.

51. The kit of claim 50, wherein the polymeric web further comprising a myoglobin blooming agent.

52. The kit of claim 50, wherein the first layer comprises a polymeric material, a non-woven material, a paper material or an absorbent material.

53. The kit of claim 50, further comprising a second layer.

54. The kit of claim 53, wherein the second layer comprises an absorbent material and has a meat contact surface.

55. The kit of claim 54, wherein the absorbent material comprises a superabsorbent polymer.

56. The kit of claim 54, wherein the first layer comprises a polymeric material, a non-woven material, or a paper material.

57. The kit of claim 56, wherein the first layer comprises a polymeric material, and wherein the myoglobin blooming agent is incorporated in the polymeric film.

58. The kit of claim 53, wherein the first layer has a meat contact surface.

59. The kit of claim 58, wherein the second layer comprises an absorbent material.

60. The kit of claim 59, wherein the absorbent material comprises a superabsorbent polymer.

61. The kit of claim 59, wherein the first layer comprises a polymeric material, a non-woven material, or a paper material.

62. The kit of claim 61, wherein the first layer is liquid permeable.

63. The kit of claim 62, wherein the first layer comprises perforations or microperforations.

64. The kit of claim 61, wherein the first layer comprises a polymeric material and the myoglobin blooming agent is incorporated in the polymeric material.

65. The kit of claim 59, further comprising a third layer wherein the second layer is disposed between the first and third layers, the first layer being attached to the third layer at least partially along opposite marginal edge portions.

66. The kit of claim 65, wherein the third layer comprises a polymeric material, a non-woven material, or a paper material.

67. The kit of claim 65, wherein at least one of the first layer or third layer is liquid permeable.

68. The kit of claim 59, wherein the second layer is liquid permeable and has a food contact surface.

69. The kit of claim 68, wherein the second layer comprises perforations or microperforations.

70. The kit of claim 68, wherein the first layer comprises an absorbent material.

71. The kit of claim 70, wherein the absorbent material comprises a superabsorbent polymer.

72. The kit of claim 59, further comprising a third layer, wherein the first layer is disposed between the second layer and the third layer, the second layer being attached to the third layer at least partially along marginal edge portions; and wherein the first layer comprises an absorbent material.

73. The kit of claim 72, wherein at least one of the second layer or third layer is liquid permeable.

74. The kit of claim 72, wherein at least one of the second layer or third layer comprises a water-soluble resin.

75. The kit of claim 50, wherein the packaging article comprises a pouch, bag, casing, overwrapped tray, form shrink package, vacuum skin package, flow wrap package, thermoformed package or a combination thereof.

\* \* \* \* \*

UNITED STATES PATENT AND TRADEMARK OFFICE
CERTIFICATE OF CORRECTION

PATENT NO. : 8,470,417 B2  
APPLICATION NO. : 11/523953  
DATED : June 25, 2013  
INVENTOR(S) : Matthew LeRoy Mengel et al.

Page 1 of 1

It is certified that error appears in the above-identified patent and that said Letters Patent is hereby corrected as shown below:

On the Title page

On the page 4, in column 2, under "Other Publications", line 53, delete "Modidfied" and insert -- Modified --, therefor.

In the Specification

In column 5, line 41, delete "meat" and insert -- meat. --, therefor.
In column 5, lines 51-52, delete "carboxymyoglin" and insert -- carboxymyoglobin --, therefor.
In column 5, lines 57-58, delete "nitrosohaemachromagen," and
insert -- nitrosohemochromogen, --, therefor.
In column 7, line 54, delete "meltblow" and insert -- meltblown --, therefor.
In column 11, line 27, delete "derivitization" and insert -- derivatization --, therefor.
In column 14, line 22, delete "S-nitroylated" and insert -- S-nitrosylated --, therefor.
In column 18, line 38, delete "acryonitrile," and insert -- acrylonitrile, --, therefor.
In column 22, line 9, delete "trimethyidodecylammonium" and
insert -- trimethyldodecylammonium --, therefor.
In column 24, line 17, delete "carboxymethylcelulose," and insert -- carboxymethylcellulose, --, therefor.
In column 27, line 65, delete "show" and insert -- shown --, therefor.
In column 31, line 38, delete "intrinsinc" and insert -- intrinsic --, therefor.

Signed and Sealed this
Eleventh Day of August, 2015

Michelle K. Lee
*Director of the United States Patent and Trademark Office*